US011537997B2

(12) United States Patent
Vangala et al.

(10) Patent No.: US 11,537,997 B2
(45) Date of Patent: Dec. 27, 2022

(54) PROVIDING TASK ASSISTANCE TO A USER

(71) Applicant: Microsoft Technology Licensing, LLC, Redmond, WA (US)

(72) Inventors: Vipindeep Vangala, Telangana (IN); Prabuddh Jaiswal, Telangana (IN); Nitin Pande, Telangana (IN); Nishchay Kumar, Telangana (IN); Sandeep Kadiyala, Telangana (IN); Sibabrata Paladhi, Telangana (IN); Raunak Oberoi, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/516,073

(22) Filed: Jul. 18, 2019

(65) Prior Publication Data

US 2021/0019713 A1 Jan. 21, 2021

(51) Int. Cl.
*G06Q 10/00* (2012.01)
*G06Q 10/10* (2012.01)

(52) U.S. Cl.
CPC ....... *G06Q 10/1097* (2013.01); *G06Q 10/103* (2013.01); *G06Q 10/1091* (2013.01); *G06Q 10/1095* (2013.01)

(58) Field of Classification Search
None
See application file for complete search history.

(56) References Cited

U.S. PATENT DOCUMENTS

| | | | | |
|---|---|---|---|---|
| 6,016,478 A | * | 1/2000 | Zhang | G06Q 10/1095 709/202 |
| 6,049,776 A | * | 4/2000 | Donnelly | G06Q 10/105 705/320 |
| 6,925,605 B2 | | 8/2005 | Bates et al. | |
| 7,027,463 B2 | * | 4/2006 | Mathew | G06Q 10/107 370/401 |
| 7,082,402 B2 | * | 7/2006 | Conmy | G06Q 10/109 705/7.19 |
| 7,827,240 B1 | * | 11/2010 | Atkins | G06Q 10/109 709/200 |
| 7,849,044 B2 | | 12/2010 | Nelken | |
| 7,865,458 B2 | | 1/2011 | Callanan et al. | |
| 7,885,948 B2 | | 2/2011 | Johnson et al. | |
| 8,065,175 B1 | * | 11/2011 | Lewis | G06Q 10/063116 705/7.17 |

(Continued)

OTHER PUBLICATIONS

Dietterich, Thomas G. "Machine-learning research." AI magazine 18.4 (1997): 97-97. (Year: 1997).*

(Continued)

*Primary Examiner* — Gurkanwaljit Singh

(57) ABSTRACT

An intelligent task assistant program can identify tasks associated with a user over a reporting period based on an analysis of, and inferences drawn from, data associated with one or more personal information programs, such as an electronic calendar application, an electronic reminder application, an electronic collaborative application, and/or an electronic communication application. The task assistant may also prioritize the identified tasks based on content associated with the tasks. Some or all of the prioritized tasks can be provided to an output device for perception by the user.

20 Claims, 19 Drawing Sheets

(56) References Cited

U.S. PATENT DOCUMENTS

| | | | | |
|---|---|---|---|---|
| 8,185,527 B2* | 5/2012 | Piccinini | ................ | G06Q 10/00 707/804 |
| 8,205,163 B2 | 6/2012 | Shaffer et al. | | |
| 8,230,024 B2 | 7/2012 | Ramanathan et al. | | |
| 10,353,937 B2* | 7/2019 | Moeller-Bertram | ... | G06N 20/00 |
| 2001/0014866 A1* | 8/2001 | Conmy | ................ | G06F 40/103 705/7.19 |
| 2001/0014867 A1* | 8/2001 | Conmy | ................ | G06F 16/972 705/7.18 |
| 2003/0097273 A1* | 5/2003 | Carpenter, Jr. | ........ | G06Q 10/06 705/301 |
| 2005/0034079 A1* | 2/2005 | Gunasekar | ............ | H04M 3/567 715/756 |
| 2005/0060638 A1* | 3/2005 | Mathew | ................ | H04L 51/00 715/255 |
| 2005/0063365 A1* | 3/2005 | Mathew | ............... | G06Q 10/107 370/352 |
| 2005/0120108 A1* | 6/2005 | Wisniewski | .......... | H04L 51/234 709/224 |
| 2006/0031340 A1* | 2/2006 | Mathew | ............... | H04L 51/214 707/999.2 |
| 2006/0229896 A1* | 10/2006 | Rosen | ................ | G06Q 10/1053 705/321 |
| 2007/0250370 A1* | 10/2007 | Partridge | ....... | G06Q 10/063116 705/7.14 |
| 2007/0250784 A1* | 10/2007 | Riley | ..................... | G06Q 10/10 715/764 |
| 2007/0300225 A1 | 12/2007 | Macbeth et al. | | |
| 2008/0114628 A1* | 5/2008 | Johnson | ........... | G06Q 10/06311 707/999.104 |
| 2008/0127231 A1 | 5/2008 | Shaffer et al. | | |
| 2009/0319926 A1 | 12/2009 | Chakra et al. | | |
| 2010/0169146 A1* | 7/2010 | Hoyne | ................. | G06Q 10/109 705/7.21 |
| 2010/0174759 A1* | 7/2010 | Piccinini | ................ | G06Q 10/00 707/805 |
| 2010/0269049 A1* | 10/2010 | Fearon | ................ | G06Q 10/109 715/752 |
| 2011/0093913 A1* | 4/2011 | Wohlert | .............. | H04L 63/0861 726/1 |
| 2011/0231409 A1* | 9/2011 | Dhara | ..................... | H04L 47/70 707/748 |
| 2012/0323933 A1 | 12/2012 | He et al. | | |
| 2013/0304442 A1* | 11/2013 | Hu | .......................... | G06F 30/20 703/6 |
| 2014/0172483 A1* | 6/2014 | Bellers | ................. | G06Q 10/025 705/7.19 |
| 2014/0278690 A1* | 9/2014 | Agarwal | ............ | G06Q 10/0633 705/7.22 |
| 2015/0193722 A1* | 7/2015 | Seaman | ............. | G06Q 10/1095 705/7.15 |
| 2015/0347987 A1* | 12/2015 | Ali | ...................... | G06Q 10/1097 705/7.21 |
| 2016/0328683 A1* | 11/2016 | Palavalli | ................. | G06F 9/485 |
| 2016/0379175 A1* | 12/2016 | Bhattacharya | ..... | G06Q 10/1097 705/7.21 |
| 2017/0161624 A1* | 6/2017 | Porter | ...................... | G06N 5/04 |
| 2017/0169375 A1* | 6/2017 | Szeto | ............. | G06Q 10/06314 |
| 2017/0193349 A1 | 7/2017 | Jothilingam et al. | | |
| 2017/0316022 A1* | 11/2017 | Joshi | .................. | G06Q 10/0631 |
| 2017/0316387 A1* | 11/2017 | Joshi | .................. | G06Q 10/0633 |
| 2017/0344931 A1* | 11/2017 | Shenk | ................... | G06F 3/0481 |
| 2018/0152407 A1* | 5/2018 | Soni | ....................... | H04L 51/234 |
| 2018/0300398 A1* | 10/2018 | Moeller-Bertram | ........................ | G06K 9/6232 |
| 2018/0322442 A1* | 11/2018 | Gupta | ............ | G06Q 10/063112 |

OTHER PUBLICATIONS

Mitchell, Tom M., et al. "Experience with a learning personal assistant." Communications of the ACM 37.7 (1994): 80-91. (Year: 1994).*

Kozierok, Robyn, and Pattie Maes. "A learning interface agent for scheduling meetings." Proceedings of the 1st international conference on Intelligent user interfaces. 1993. (Year: 1993).*

Gkekas, Georgios, Anna Kyrikou, and Nikos Ioannidis. "A smart calendar application for mobile environments." Proceedings of the 3rd international conference on Mobile multimedia communications. 2007. (Year: 2007).*

Oh, Jean, and Stephen F. Smith. "Learning calendar scheduling preferences in hierarchical organizations." International Workshop on Preferences and Soft Constraints. 2004. (Year: 2004).*

Gervasio, Melinda T., et al. "Active preference learning for personalized calendar scheduling assistance." Proceedings of the 10th international conference on Intelligent user interfaces. 2005. (Year: 2005).*

"International Search Report and Written Opinion Issued in PCT Application No. PCT/US20/036862", dated Sep. 17, 2020, 10 Pages.

* cited by examiner

PROVIDING TASK ASSISTANCE TO A USER

BACKGROUND

Many professionals have a variety of tasks to manage and complete in a given period of time, such as a day, a week, or a month. The tasks can include attending meetings, sending and responding to electronic communications, and completing assignments. Additionally, a professional often has to filter or prioritize his pending and new tasks on a daily basis. In some instances, the professional monitors and prioritizes his or her tasks manually, such as through to-do lists.

These actions can be more significant or relevant when the professional will be out of the office for a period of time. For example, the professional may be on vacation or attending a business function. Typically, prior to being out of office, the professional can be under additional stress as he attempts to complete as many tasks as possible and delegate and reschedule other tasks. While the professional is out of the office, new tasks can be assigned to him or the priority of pending tasks may change. Consequently, the professional may check his electronic communications, or call the office, several times a day to ensure he does not miss anything. And once the professional returns to the office after being away for a while, he typically has to manually determine the tasks he or she still needs to complete, identify new tasks that have been assigned to him, and follow up on the tasks that were delegated or rescheduled before the professional went away.

It is with respect to these and other general considerations that embodiments have been described. Also, although relatively specific problems have been discussed, it should be understood that the embodiments should not be limited to solving the specific problems identified in the background.

SUMMARY

Embodiments disclosed herein provide techniques for identifying tasks associated with a user over a reporting period based on an analysis of, and inferences drawn from, data associated with one or more personal information programs. Additionally, in some instances, a priority for each identified task may be determined. Some or all of the tasks or the prioritized tasks can be provided to an output device for perception by the user.

In one aspect, a method includes determining tasks associated with a user in a reporting period based on personal information program (PIP) data. The PIP data can be associated with a personal information program, such as, for example, an electronic calendar application, an electronic reminder application, an electronic contacts application, a collaborative application, and/or an electronic communication application. A priority of each task is determined based on the reporting period and content associated with the task to produce prioritized tasks. At least a portion of the prioritized tasks is provided, or is caused to be provided to an output device. For example, at least a portion of the prioritized tasks may be displayed at a display screen. In one embodiment, the method is performed by a computing device that includes a processing device executing instructions comprising one or more machine learning algorithms.

In another aspect, a system includes a processing device and a memory. The memory stores instructions, that when executed by the processing device, cause the system to perform operations. The operations include determining tasks associated with a user in a reporting period based on personal information program (PIP) data. The PIP data can be associated with a personal information program, such as, for example, an electronic calendar application, an electronic reminder application, an electronic contacts application, a collaborative application, and/or an electronic communication application. A priority of each task is determined based on the reporting period and content associated with the task to produce prioritized tasks. At least a portion of the prioritized tasks are provided, or are caused to be provided, to an output device.

In yet another aspect, a method includes determining a plurality of tasks associated with a user in a reporting period based on PIP data. As previously described, the PIP data can be associated with an electronic calendar application, an electronic reminder application, an electronic contacts application, or an electronic communication application. A priority of each task in the plurality of tasks is determined based on the reporting period and content associated with the task to produce a plurality of prioritized tasks. A portion of the plurality of prioritized tasks can be displayed, or caused to be displayed in a user interface, where at least one of the prioritized tasks comprises an interactive notification that includes one or more control elements. Each control element enables the user to perform an operation on the task, such as, for example, rescheduling the task, delegating the task, canceling the task, and indicating the task is completed. In one embodiment, the method is performed by a machine learning processing device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

Figure 1:
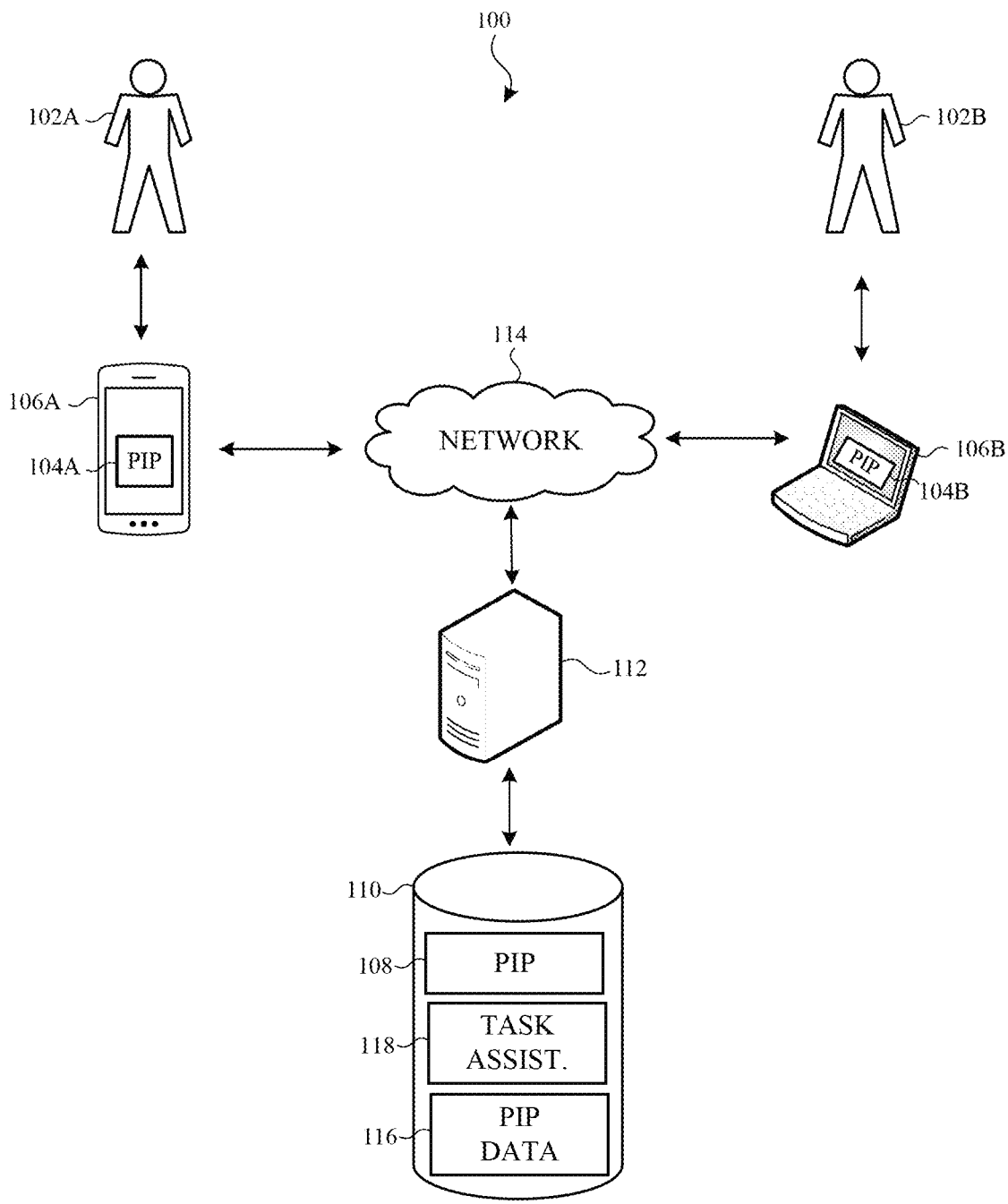
FIG. 1 depicts a block diagram of a distributed computing system in which aspects of the present disclosure may be practiced.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Personal information programs (PIP) are widely used by individuals on their personal computing devices as well as throughout businesses, organizations, venture, and other entities (hereinafter "enterprise"). PIPs are software applications that provide and/or manage electronic communications, electronic calendars, electronic lists or entries of contacts, electronic reminders, electronic to-do lists, and other data. The data associated with the PIPs ("PIP data") is stored as computer-generated and computer-readable data at each user's computing device and/or at a cloud or enterprise storage device or memory that is accessible over a network.

Embodiments disclosed herein provide an intelligent task assistant program (hereinafter "task assistant") that can identify tasks associated with a user over a given period of time ("reporting period") based on an analysis of, and inferences drawn from, the user's PIP data. Once activated, the task assistant determines one or more tasks associated with the user based on some or all of the PIP data accessible by the task assistant. As used herein, a "task" refers to an action the user is to perform. For example, a task may be sending an electronic communication or working on or completing a job, and/or attending a meeting, an appointment, or an event (e.g., a concert, a trade show, an educational event, and the like). The term "event" refers to a meeting, appointment, or event on a calendar.

The task assistant may also prioritize the identified tasks to inform the user of his or her most important tasks. The importance of a task can be based on a due date, a person or the people associated with the task, the subject of the task, and the like. Some or all of the prioritized tasks can be provided to an output device for perception by the user. For example, the task assistant can cause the prioritized tasks to be displayed on a display screen. Alternatively, the task assistant may cause the top N tasks to be displayed on the display screen, where N is a number equal to or greater than zero. In an example embodiment, the task assistant may present the top five tasks to the user.

In some embodiments, the task assistant prioritizes the tasks in the context of a reporting period. The reporting period may be set by the user. For example, a user may want the task assistant to provide his or her tasks every day or every Monday (e.g., the start of the work week). In another example, the reporting period can cover a time period before and/or after a period when the user will be unavailable (e.g., out of the office).

Additionally or alternatively, the task assistant prioritizes the tasks based on the circumstance(s) associated with the reporting period. In an example embodiment, the task assistant can detect the user will be on a week-long vacation. Prior to the start of the vacation, the task assistant may identify and prioritize the user's tasks for the week the user will be on vacation, and provide the tasks to an output device. Thus, the circumstance associated with the reporting period (e.g., the week) is the vacation.

In some embodiments, the task assistant can further assist the user in completing a task by performing one or more operations on the tasks. For example, the user can instruct the task assistant that a particular task has been completed. Additionally or alternatively, the task assistant can assist the user in delegating a task, rescheduling a task, canceling a task, and/or deferring a task.

Non-limiting and non-exhaustive examples are described with reference to the following FIGS. 1-19. The elements of the drawings are not necessarily to scale relative to each other. Identical reference numerals have been used, where possible, to designate identical features that are common to the figures.

FIG. 1 illustrates a block diagram of a distributed computing system in which aspects of the present disclosure may be practiced. In one embodiment, the system 100 is an enterprise system that provides users 102A, 102B with a personal information program (PIP) 104A, 104B, respectively, that the users 102A, 102B can access and interact with on computing devices 106A, 106B. Each PIP 104A, 104B can include an electronic calendar, contacts, electronic notes, electronic reminders, electronic to-do lists, and other data. As used herein, the term "PIP data" relates to the electronic data associated with the electronic calendar, contacts, electronic notes, electronic reminders, electronic to-do lists, and other electronic data associated with the PIP.

A PIP 108 may be stored on one or more storage devices (represented by storage device 110). The PIPs 104A, 104B executing on computing devices 106A, 106B can access and/or interact with a PIP 108 executing on one or more server computing devices (represented by server computing device 112) using one or more networks (represented by network 114). The network 114 is illustrative of an intranet and/or a distributed computing network such as the Internet.

Figure 17:
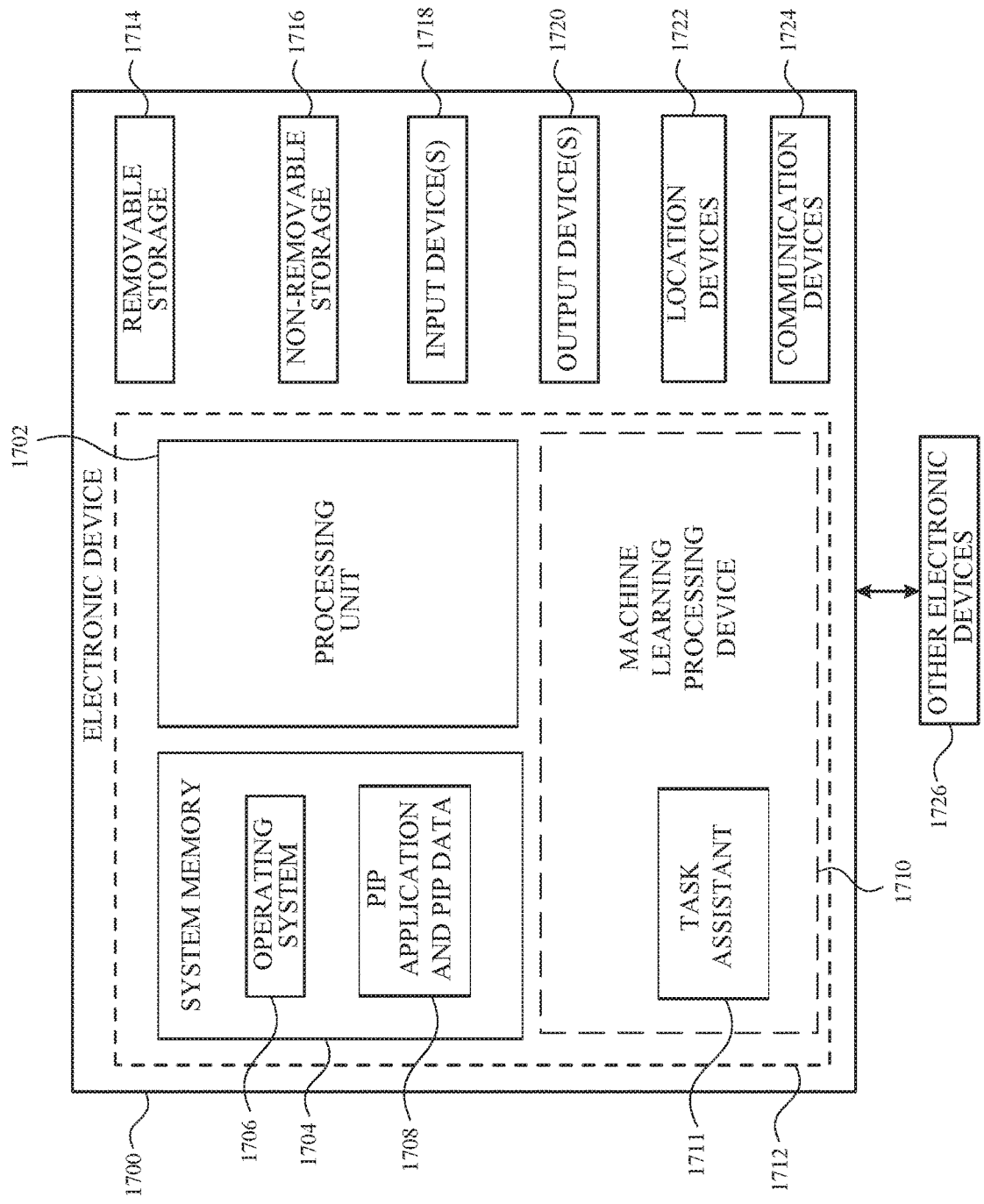
FIG. 17 is a block diagram depicting example physical components of a computing device with which aspects of the disclosure may be practiced.

In one embodiment, the PIP data of the users 102A, 102B is stored on a respective computing device 106A, 106B (not shown in FIG. 1; see e.g., 1710 in FIG. 17). Additionally or alternatively, the PIP data 116 associated with the users 102A, 102B can be stored in the storage device 110. As will be described in more detail later, a task assistant stored on storage device 110 and executed by the server computing device 112 can analyze a user's PIP data to provide assistance to the user in identifying and completing one or more tasks. In other embodiments, the task assistant program 118 can be implemented on the computing devices 106A, 106B, or be distributed between the server computing device 112 and the computing devices 106A, 106B.

Figure 2:
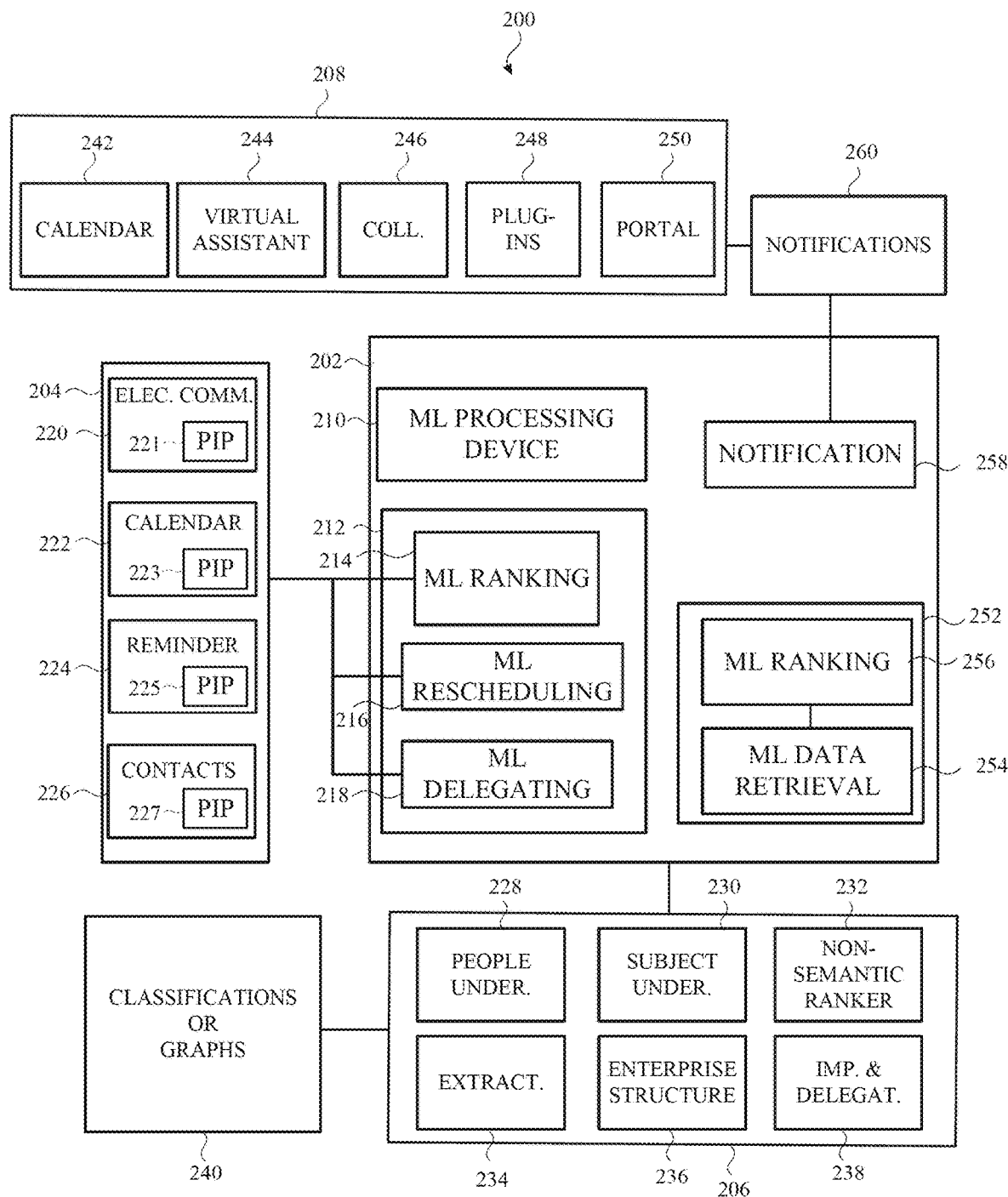
FIG. 2 illustrates a block diagram of a system operable to provide assistance in task completion.

FIG. 2 illustrates a block diagram of a system operable to provide assistance in task completion. The system 200 includes a task assistant 202, one or more PIP data sources 204, one or more machine learning (ML) models 206, and one or more applications 208. In general, the task assistant 202 accesses, analyzes, and/or retrieves PIP data from the one or more PIP data sources 204 to determine the tasks associated with a user, prioritize the tasks, and perform user-requested operations on the tasks (e.g., reschedule, delegate, etc.).

The task assistant 202 includes a machine learning processing device 210 that executes one or more machine learning (ML) algorithms 212. In the illustrated embodiment, the ML algorithms 212 include a ML ranking algorithm 214, a ML rescheduling algorithm 216, and a ML delegating algorithm 218. The ML algorithms 212 receive PIP data from the PIP data sources 204, which may include electronic communications data 220, calendar data 222, reminder data 224, and contacts data 225. The ML algorithms 212 analyzes the PIP data to prioritize the tasks associated with the user and/or to perform operations on the tasks.

The ML algorithms 212 are initially trained using PIP data associated with thousands of users. The training process allows the ML algorithms to learn over time what data to consider and not consider when determining tasks, what data to analyze when prioritizing tasks, and what data to review when performing operations on the tasks. The data includes PIP data, and in some instances, other data in a user's ecosystem. Once in use, the ML algorithms 212 continue to learn based on a particular user's interactions with the task assistant. Additionally, in some embodiments, the ML algorithms continue to learn based on the interactions of a community of users (e.g., an enterprise, a nation, and/or global).

The electronic communications application 220 can include PIP data 221 associated with one or more types of electronic communications, such as electronic mail, instant messaging, web posts and social networking, and group chats. The electronic communications PIP data 221 may include, for example, sender and recipient names, time of transmission, time of receipt, subject, content of the electronic communications, and attachments or content associated with the attachments (e.g., type of document, title, author, etc.).

The calendar application 222 may include PIP data 223 can include any data associated with calendar entries, such as appointments and meetings. The calendar PIP data 223 may include, for example, dates and times of the meetings and the appointments, subject, attendees, content of the calendar entries (e.g., any descriptions or data provided in the body of the entry), and attachments or content associated with the attachments (e.g., type of document, title, author, etc.).

The reminder application 224 can include PIP data 225 associated with one or more to-do lists or reminders. The reminder PIP data 225 may include, for example, subject and/or content of the reminder, creation date, deadline date, completion date, other users associated with a reminder, and attachments or content associated with the attachments (e.g., type of document, title, author, etc.).

The contacts application 226 can include PIP data 227 associated with the contacts a user knows or interacts with, such as co-workers, managers, friends, family, co-workers, and other users. For example, the other users can be one or more users that are on the same team or project as the user, are associated with an organization or venture as the user, and/or correspond with the user by one or more electronic communication applications. The contacts PIP data 227 can be obtained or derived, for example, from one or more contact lists, senders and recipients of electronic communications, calendar entries, and/or reminders.

The one or more ML models 206 can include any number and/or type of ML models. The ML models 206 provide data and/or analysis to the one or more ML algorithms 212. In the illustrated embodiment, the ML models 206 include a people understanding model 228, a subject understanding model 230, a non-semantic ranker model 232, an extraction model 234, an enterprise structure model 236, and an importance and delegation model 238. In one embodiment, the various models can access data stored in the data storage device 240. The data can include, for example, classifications and/or relationship graphs. An example relationship graph for people is described in more detail in conjunction with FIG. 3. As part of the continued learning of the ML algorithms, the data stored in the data storage device 240 is updated at select times based on user interactions with the task assistant and on changes to the PIP data.

The people understanding model 228 can be used to determine people associated with a user. The people can be determined, for example, from one or more contact lists, senders and recipients of electronic communications, calendar entries, reminders, and/or teams the user is associated with in a collaborative application.

The subject understanding model 230 can be used to analyze and understand one or more subjects associated with the user. The subjects may include work projects, organizations, documents, assignments, etc. The subjects can be determined, for example, from one or more contact lists, electronic communications, calendar entries, reminders, and/or teams the user is associated with in a collaborative application.

The non-semantic ranker 232 may be used to identify and/or rank tasks based on characteristics other than words or phrases. For example, the non-semantic ranker 232 can rank tasks based on time, on the number of attendees to a meeting, on the number of users associated with a task, and other non-semantic features.

The extraction model 234 can be used to determine and/or rank tasks by topics in a particular application. For example, the extraction model 234 may be used to rank tasks by a topic in an electronic communications application (e.g., electronic mail).

The enterprise structure model 236 can be used to identify and/or rank tasks based on data associated with an enterprise. In a non-limiting embodiment, the data associated with the enterprise can be the structure of the enterprise, the departments in the enterprise, the locations of the buildings of the enterprise, and the job title of each user in the enterprise.

The importance and delegation model 238 can be used to identify persons that are the appropriate people/contacts, relevant to a given task or subject matter. As an example, the importance and delegation model 238 may be used to identify the appropriate person to be the delegatee for a meeting. In one embodiment, the importance and delegation model 238 includes one or more machine learning algorithms 212 and/or heuristics that can use multiple features such as, for example, topics or subject matter, people, a time frame, a location, an organizational structure, and the like.

The one or more applications 208 include applications that may be used to present the tasks, or the prioritized tasks, to the user, and to enable the users to select an operation to be performed on a task. In the illustrated embodiment, the applications 208 include a calendar application 242, an intelligent virtual assistant 244, a collaborative application 246, one or more plug-ins 248 for an application, and a portal 250. The tasks can be presented to a user on one or more of the applications. An example collaborative application 246 is MICROSOFT TEAMS and an example intelligent virtual assistant is MICROSOFT CORTANA. Additional or different applications may be used in other embodiments. In some embodiments, the portal 250 can include one or more applications that enable a user to login with his or her credentials and view the prioritized tasks. Example portal applications include, but are not limited to, an electronic mail application and a calendar application.

In some embodiments, the ML algorithms 212 are used to determine, prioritize, and/or perform operations on tasks prior to the start of a reporting period. For example, the reporting period can be a period of time when a user is on vacation and is out of the office. Thus, in some embodiments, the ML algorithms 212 are used to determine, prioritize, and/or perform operations on the tasks before the vacation.

The reporting algorithms 252 are used to provide a summary to the user at the end of the reporting period (e.g., when the user returns to the office from the vacation). The reporting algorithms 252 can include a ML data retrieval model 254 and a ML ranking model 256. The data retrieval model 254 may be used to retrieve data associated with the tasks during the reporting period. For example, the data retrieval model 254 can collect data associated with new tasks that were created during the reporting period, tasks that were deferred prior to the time period, tasks that were rescheduled prior to the time period, and/or tasks that were delegated prior to the time period.

The ML ranking model 256 can be similar to the ML ranking model 214. The ML ranking model 256 may be used to determine, or determine and prioritize, new tasks, tasks that are due at the end of the reporting period and/or that are due within a given time period after the reporting period, and/or are overdue at the end of the reporting period. In some embodiments, only one ML ranking model is used to determine the tasks, and possible prioritize tasks, before and after the reporting period.

The notification algorithm 258 generates task notifications 260 for the tasks determined before and after the given time period. The task notifications 260 can be presented in a user interface of a particular application, such as one or more of the applications 208. Additionally or alternatively, the task notifications may be sent to other devices associated with the user, such as a tablet or a mobile phone (see 1906 and 1908 in FIG. 19).

The block diagram in FIG. 2 is an example of a system operable to provide assistance in task completion. Other embodiments can omit, add, or modify the blocks. For example, the machine learning (ML) models 206 can include fewer ML models, different ML models, or additional ML models. Similarly, the data storage 240 may store different types of data that can be used by the task assistant 202.

Figure 3:
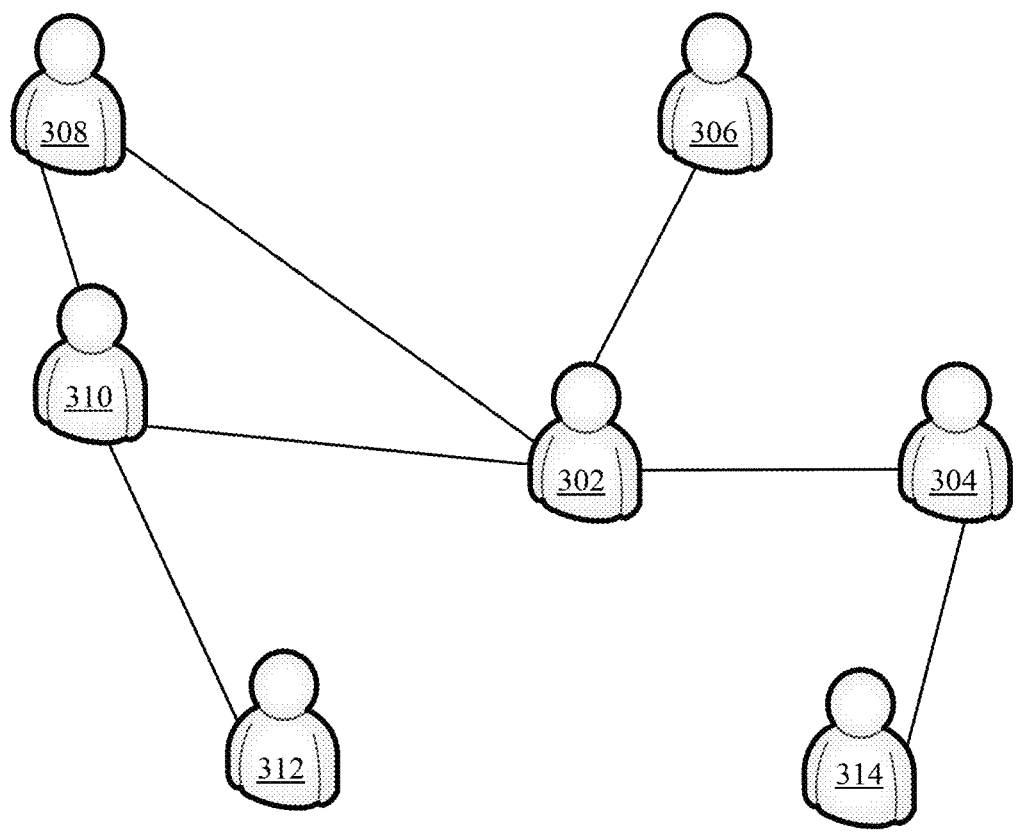
FIG. 3 is an example relationship graph that can be used to determine one or more people associated with a user.

FIG. 3 is an example relationship graph that can be used to determine one or more people associated with a user. As described earlier, the people can be determined, for example, from one or more contact lists, senders and recipients of electronic communications, calendar entries, reminders, and/or teams the user is associated with in a collaborative application. The relationship graph 300 may be used by the people understanding model 228 when the task assistant 202 is analyzing one or more of the PIP data 221, 223, 225, 227 to determine people associated with the user based on a topic or task.

In the illustrated embodiment, the user 302 is linked or associated directly with users 304, 306, 308, 310 for a particular topic or task. Users 312, 314 are associated indirectly with the user 302. The user 312 is associated with the user 302 through user 310 and the user 314 is associated with the user 302 through user 304. Because the users 304, 306, 308, 310 are connected or related to the user 302 directly, the tasks associated with the user 302 and at least one of the users 304, 306,308, 310 may be ranked higher than the tasks that include users 312, 314. Additionally or alternatively, the users 304, 306, 308, 310 can be identified first (e.g., considered more important) compared to the users 312, 314 when the task assistant is performing an operation associated with a task. For example, in a non-limiting embodiment, the task assistant may delegate a task associated with the user 302 to user 304, user 306, user 308, or user 310 instead of the users 312, 314.

Other types of relationship graphs may be created, updated, and used for the subject understanding model 230, the non-semantic ranker model 232, the extraction model 234, the enterprise structure model 236, and/or the importance and delegation model 238. In one embodiment, a global relationship graph may be generated for an entity that includes all relationships associated with that entity. An entity may be a user, a project, a team, a company, and the like.

Figure 4:
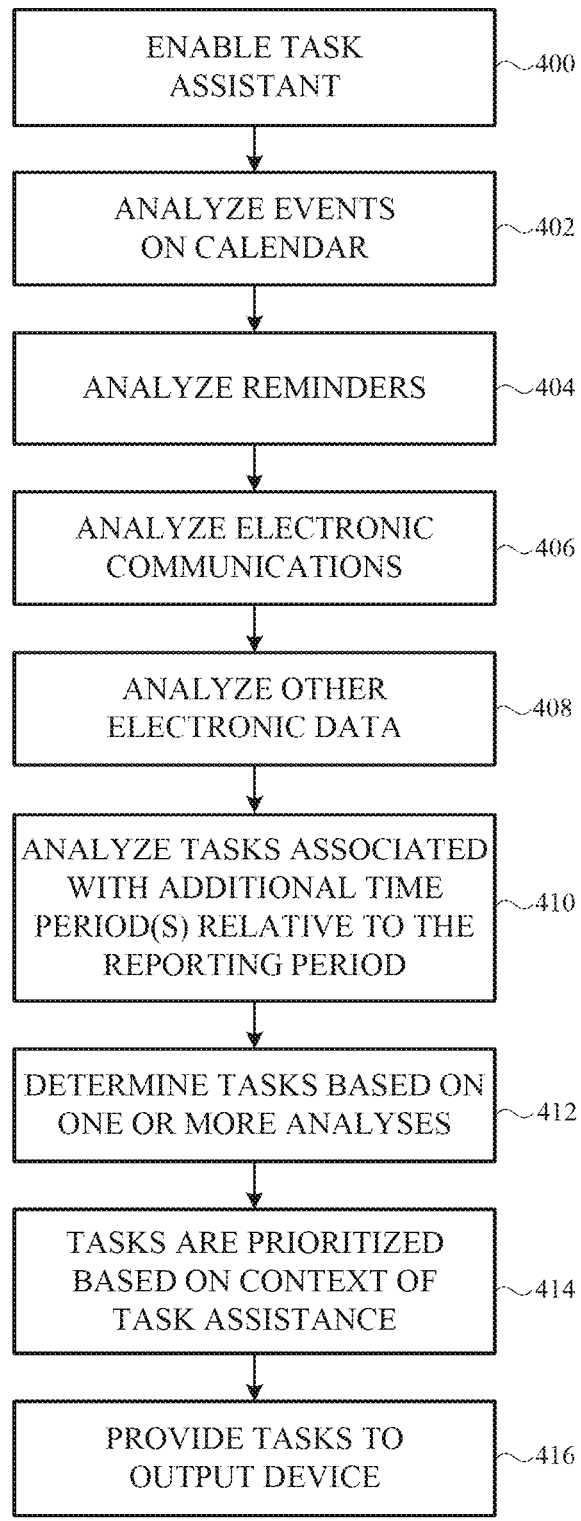
FIG. 4 is a flowchart of an example method of providing task assistance.

FIG. 4 is a flowchart of an example method of providing task assistance. In some implementations, the tasks can be personal tasks, tasks associated with work, or a combination thereof. Task assistance can be provided in a variety of situations. For example, a user can use task assistance for a given period of time, such as at the start of a work week or every day. Additionally or alternatively, task assistance may be provided prior to and/or after a time period when the user is/was unavailable (e.g., on vacation).

Initially, as shown in block 400, the task assistant is enabled. Activation of the task assistant can occur in a variety of ways. In one embodiment the task assistant can detect or infer a user will be out of the office and responsively provide task assistance. For example, the task assistant can analyze the contents of one or more electronic communications sent to, and/or received by, the user to determine the user will be out of the office (e.g., on vacation) for a given period of time. The electronic communications may provide information about the time period the user will be out of the office (the reporting period), such as flight information, hotel reservations, the location and dates of a meeting or seminar, and the like. Additionally or alternatively, the task assistant can analyze the user's calendar and contents of the events on the calendar and detect or infer the user will be out of the office.

In another embodiment, a user can enable the task assistant manually. For example, the user can select an icon or a graphical control element presented in a user interface to activate task assistance. In some instances, the task assistant can be activated via a menu selection, taskbar, or a keyboard shortcut. In yet another embodiment, the task assistant may be activated through a settings or user preference menu. The settings menu can enable a user to select when (e.g., a particular day or a select period of time) and how often (e.g., one time or recurring) the task assistant is to operate, and the time period to be reviewed (e.g., the reporting period). For example, a user may want the task assistant to determine his or her upcoming tasks every day or every Monday. The settings menu can be used to schedule such operations.

Next, as shown in block 402, the task assistant can analyze the PIP data associated with the user's calendar application and the content associated with events on the calendar. The PIP data includes the events and the content associated with each event. By way of example only, the content associated with an event can be other users associated with the event, the subject of the event, the date and time of the event, and any attachments to the event (e.g., documents). Based on the analysis, the task assistant determines the upcoming tasks, pending tasks, and/or tasks due during the reporting period.

In some instances, the task assistant may also analyze the PIP data associated with an electronic reminder application (block 404). The PIP data includes, but is not limited to, the reminders and the content associated with each reminder. By way of example only, the content can include other users associated with a reminder, the subject of the reminder, the deadline associated with the reminder, and any attachments to the reminder (e.g., documents). Based on the analysis, the task assistant determines the upcoming tasks, pending tasks, and/or tasks due during the reporting period.

Additionally or alternatively, the task assistant can analyzes the PIP data associated with one or more electronic communication applications (block 406). The PIP data includes, for example, the electronic communications received and sent by the user and the content associated with the electronic communications. The content may include the messages in the body of the electronic communications, the dates and times of the electronic communications, other recipients to the electronic communications, the subject, and any attachments to the electronic communications. Based on the analysis, the task assistant determines the upcoming tasks, pending tasks, and/or tasks due during the reporting period.

In some embodiments, the task assistant may analyze other electronic data at block 408. For example, the PIP data associated with other applications, such as a collaborative application, a notes application, images, video, and the like may be analyzed by the task assistant to determine the tasks associated with the reporting period. Additionally or alternatively, the task assistant may review the tasks associated with additional time periods relative to the reporting period (block 410). For example, the task assistant may consider the tasks associated with the week before the reporting period.

Based on the analysis or analyses, the task assistant determines the tasks for a user during the reporting period (block 412). A task assistant can perform some or all of the blocks 402, 404, 406, 408, 410 when determining tasks. For example, the task assistant may perform blocks 402 and 404 to determine a user's tasks in a reporting period.

Based on the context of the task assistance, the tasks associated with the user may be prioritized at block 414. The context of the task assistance can include, for example, the reporting period, the due dates, and other users associated with the tasks. The prioritized tasks can then be provided to an output device for perception by the user (block 416). For example, the prioritized tasks can be displayed on a display screen. One or more options for each prioritized task may also be presented. In some aspects, a user can be presented with one or more options for some or all of the prioritized tasks. For example, one or more graphical control elements can be presented to the user for at least one prioritized task that enable the user to reschedule, delegate, defer, and/or cancel the identified tasks. In some embodiments, a virtual assistant may present the option(s) and the operations by generating an audio output.

In one embodiment, the prioritized tasks, and optionally the one or more options, can be displayed in a user interface. The user interface may be a user interface of an application, such as a calendar application, a reminder application, an email application, a collaborative application, or a unified communications application. Alternatively, the user interface can be a panel that is separate from an application user interface.

Figure 5:
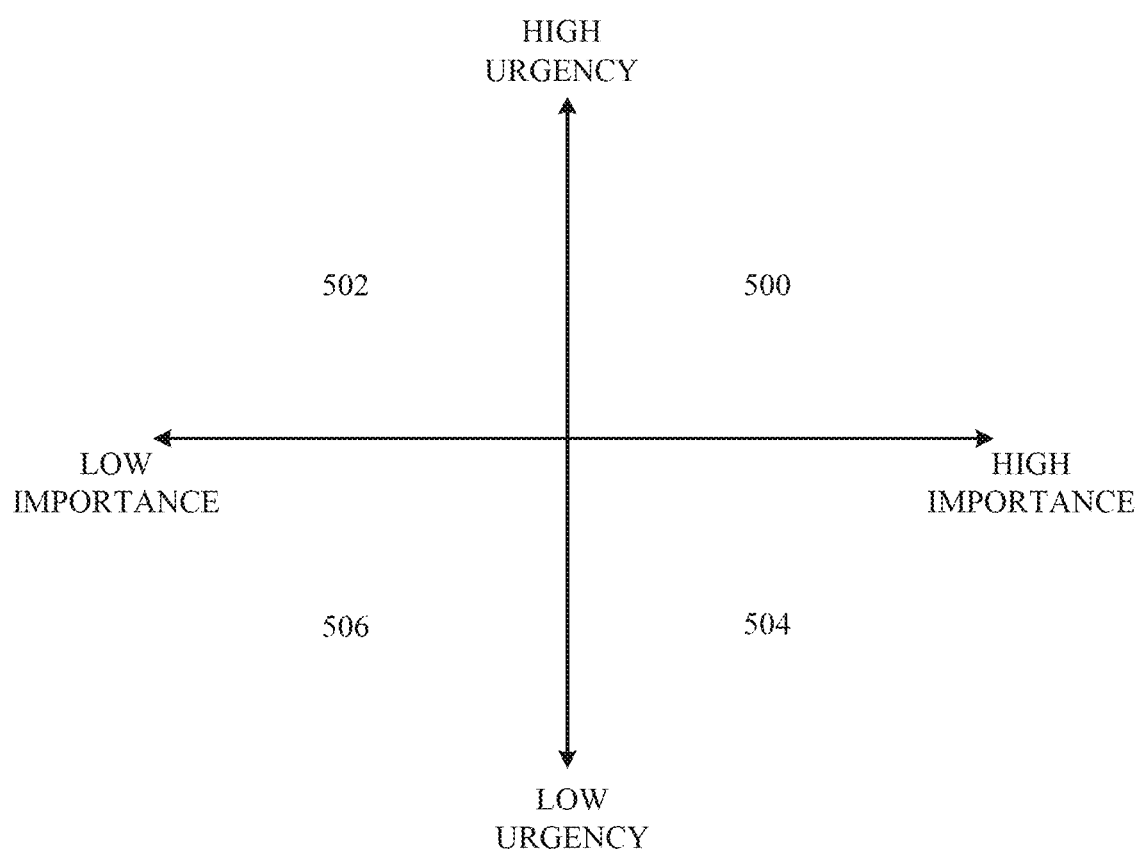
FIG. 5 depicts an urgent-important matrix that can be used to determine priority.

FIG. 5 depicts an urgent-important matrix that can be used to determine priority. Other embodiments can determine priority using a different technique or techniques. In one embodiment, the tasks, communications, reminders, and the like in quadrant 500, 502, and 504 are tasks that the task assistant may identify as tasks the user should complete as soon as possible (e.g., before a vacation). The tasks that fall in quadrant 500 may also be tasks the user can monitor or allow interruptions (e.g., emails, notifications) during a given period of time (e.g., while the user is on vacation). In some instances, the task assistant can notify the user about new tasks associated with quadrants 500, 502, 504 after the given period of time (e.g., the user returns from the vacation). Other embodiments can perform these actions for tasks in fewer quadrants (e.g., quadrants 500, 502). Additionally or alternatively, a user may specify which quadrants the task assistant is to operate on or monitor.

Figure 6:
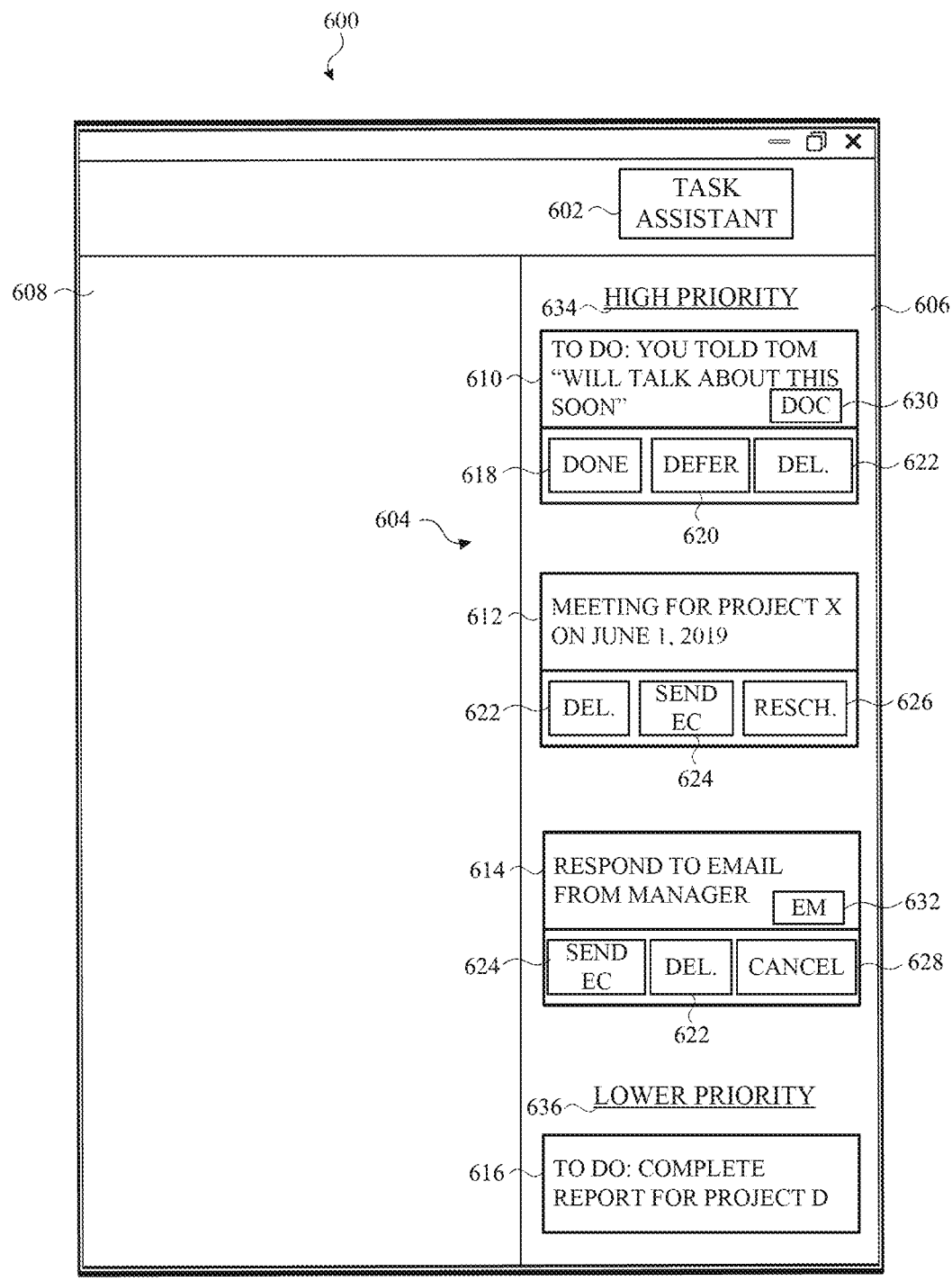
FIG. 6 illustrates an example graphical user interface showing prioritized tasks.

FIG. 6 illustrates an example graphical user interface showing prioritized tasks. The user interface 600 can include a graphical control element 602, that when selected by a user, causes the task assistant to determine tasks and generate a list of tasks 604. Although four tasks are shown in the list of tasks 604, other embodiments can include any number of tasks, including zero tasks.

The list of tasks 604 are displayed in a pane 606 of the user interface 600. In some embodiments, a second pane 608 may also be displayed in the user interface 600. The user interface 600 can be associated with a particular application, such as an electronic communications application, a calendar application, and the like. Thus, the second pane 608 may present data associated with the particular application. For example, when the application is an electronic communications application, such as an electronic mail application, the second pane 608 can display multiple electronic messages or a particular electronic message.

The representative tasks 610, 612, 614, 616 relate to a first to-do or reminder (task 610), a meeting (task 612), an electronic communication (task 614), and a second reminder (task 616). In one embodiment, the tasks 610, 612, 614, 616 are listed in no particular order, although other embodiments are not limited to this configuration. Additionally, the tasks 610, 612, 614 are interactive notifications in which a user can select a control element associated with one or more operations. For example, the task 610 is depicted with three control elements 618, 620, 622. When the user completes the task 610, the user can select the "Done" control element 618. In such embodiments, the task assistant may remove the task 610 from the list of tasks 604, modify the task 610 to indicate the task 610 is completed, and/or add the word "Done" or "Completed" to the text of the task 610. For example, the task 610 may be greyed out or moved to the end of the list of tasks 604. Other embodiments can perform a different operation when a user indicates a task is completed.

If the user wants to defer the task 610, the user may select the "Defer" control element 620. In response to the selection, the task assistant defers the task and adjusts the list of tasks. For example, the task assistant may remove the task from the list of tasks. Alternatively, the task assistant can modify the task to indicate the task is deferred or on hold. For example, the task may be greyed out, moved to a different position in the list of tasks (e.g., at the end of the list), and/or the words "On Hold" can be added to the text in the task. Other embodiments can perform a different operation when a task is deferred.

If the user wants to delegate the task 610, the user may select the "Delegate" control element 622 (shown as "Del."). In response to the selection, the task assistant can determine one or more other users to delegate the task to (a delegatee). The task assistant can analyze the subject of the task, the users associated with the subject of the task, any other users associated with the subject of the task, as well as other factors when determining the one or more delegatees. In one embodiment, the ML processing device 210 executing the ML delegating algorithm 218 (FIG. 2) can perform the delegation operation. An example method of delegating a task is described in more detail in conjunction with FIG. 6.

The task 612 relates to a future meeting and is shown with three control elements 622, 624, 626. If the user wants to delegate the task, the user may select the "Delegate" control element 622 (shown as "Del."). If the user wants to send an electronic communication regarding the task 612, such as an electronic mail message, the user can select the "Send Electronic Communication" control element 624 (shown as "Send EC"). In response to the selection, an electronic communication application may be launched to enable the user to draft and send the electronic communication. In one embodiment, the electronic communication is displayed in the second pane 608. In another embodiment, the electronic communication is presented in a separate user interface.

If the user wants to reschedule the task 612, the user may select the "Reschedule" control element 626 (shown as "Resch."). When selected, the task assistant may analyze factors such as the subject of the meeting, any other attendees and their associated calendars, and any other users associated with the subject of the meeting to determine one or more alternative times and dates for the meeting. In one embodiment, a notification may be sent to the meeting organizer indicating the user has requested the meeting be rescheduled and provide the one or more alternative meeting times. In another embodiment, the task assistant can cause a user interface to be presented to the user with the one or more alternative meeting times. Based on a selection of a particular meeting time, the task assistant may reschedule the meeting. In one embodiment, the ML processing device 210 executing the ML rescheduling algorithm 216 (FIG. 2) can perform the rescheduling operation.

The task 614 relates to an electronic communication and is shown with three control elements 622, 624, 628. If the user wants to send an electronic communication regarding the task 614, such as an electronic mail message, the user can select the "Send Electronic Communication" control element 624 (shown as "Send EC"). If the user wants to delegate the task 614, the user may select the "Delegate" control element 622 (shown as "Del.").

If the user wants to cancel the task 614, the user can select the "Cancel" control element 628. When the control element 628 is selected, the task assistant may cancel the task 614 and remove the task 614 from the list of tasks 604. Alternatively, the task assistant can cancel the task 614 and modify the task 614 to indicate the task 614 is canceled. For example, the task 614 may be greyed out, moved to the end of the list of tasks 604, and/or the word "Canceled" can be added to the text in the task 614. Other embodiments can perform a different operation when a user indicates a task is completed.

The task 616 relates to a reminder and does not include any control elements. In one embodiment, the task assistant has associated the task 616 to a lower priority (e.g., medium priority), although this is not required. Additionally or alternatively, one or more control elements may be displayed in response to a user selecting the task 616 (e.g., double clicking on the task 616).

In some embodiments, the task assistant can attach an attachment to a task. For example, as shown in FIG. 6, a document attachment 630 related to the subject of the task 610 is attached to the task 610 and an electronic message (EM) attachment 632 related to the task 614 is attached to the task 614. The document attachment 628 can be the document itself or a pointer or link to the document. Similarly, the EM attachment 630 may be the electronic message itself or a pointer or link to the electronic message.

The task assistant can include one or more headers 634, 636 in the list of tasks 604. For example, as shown in FIG. 6, the header 634 identifies the tasks below the header 634 as "High Priority." Similarly, the header 636 identifies the tasks below the header 636 as "Lower Priority." Other headers can be used in other embodiments.

Figure 7:
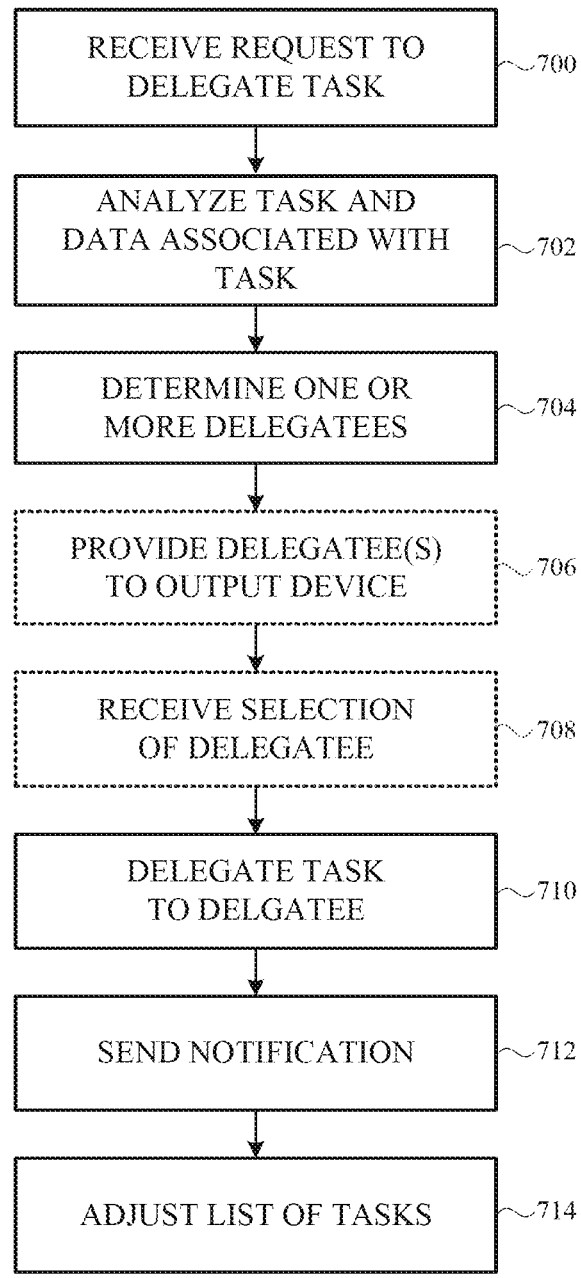
FIG. 7 is a flowchart of a method of delegating a task.

FIG. 7 is a flowchart of a method of delegating a task. Initially, a task assistant receives a request to delegate a task at block 700. In one embodiment, the request is submitted to the task assistant in response to a user selecting a control element (e.g., control element 622 in FIG. 6). Alternatively, a request to reschedule a task may be submitted differently, such as via a menu selection (e.g., a drop-down menu), taskbar, or a keyboard shortcut.

Next, as shown in block 702, the task assistant analyzes the task and data associated with the task. For example, the task assistant can analyze the subject of the task, other users associated with the task such as one or more users on the same project or team and/or a manager, a deadline for the task, any attachments associated with the task, and the like. Based on the analysis, the task assistant can determine one or more delegatees for the task (block 704). Information associated with the delegatee(s), such as a name, a phone number, an email address, are provided to an output device at block 706. In one embodiment, the information associated with the one or more delegatees is presented on a display. In another embodiment, a virtual assistant may present the information, for example, by generating an audio output.

A selection of a delegatee may be received at block 708. For example, the information associated with the delegatee(s) can be displayed in a user interface with a user interface selection control that enables the user to select a particular delegatee. At block 710, the task assistant delegates the task to the delegatee. A notification indicating the delegation of the task may be sent to the delegatee and possibly to other users at block 712. For example, a notification can be sent to the delegatee and his or her manager, or to the delegatee and the manager of the user (the delegator).

After the task is delegated, the task assistant may modify the list of tasks (block 714). For example, the task assistant may remove the task from the list of tasks. Alternatively, the task assistant can modify the task to indicate the task is delegated. For example, the task may be greyed out, moved to the end of the list of tasks, and/or the word "Delegated" can be added to the text in the task. Other embodiments can perform a different operation when a task is delegated.

Blocks 706 and 708 are optional and may be omitted in other embodiments (indicated by dashed lines). For example, a task assistant may determine a delegatee and automatically delegate the task to the delegatee without any user interaction or input.

Figure 8:
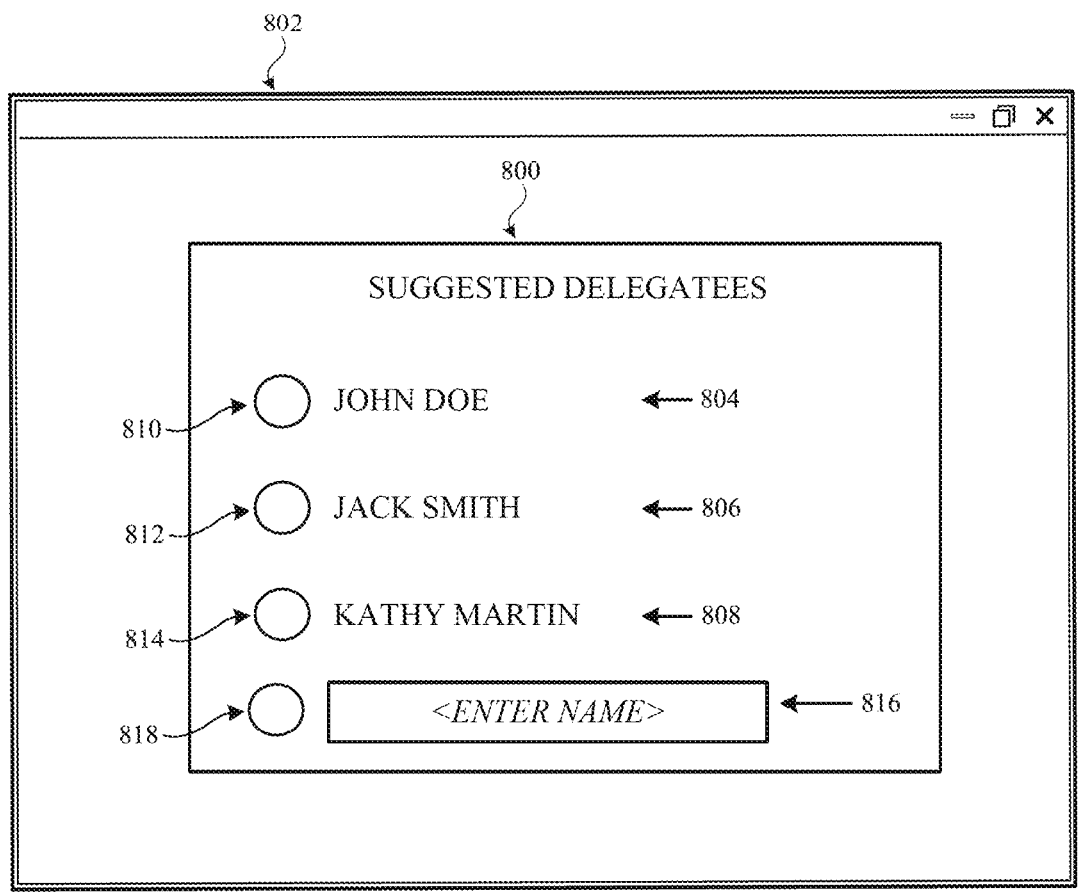
FIG. 8 depicts an example graphical user interface for delegating a task.

FIG. 8 depicts an example graphical user interface for delegating a task. In some aspects, the panel 800 can be used to present one or more delegatees at block 706 in FIG. 6. The panel 800 lists one or more suggested delegatees and may be presented in a user interface 802. Three named delegatees 804, 806, 808 are shown in FIG. 8, although other embodiments are not limited to three delegatees. A user interface selection control 810, 812, 814 is associated with each suggested delegatee 804, 806, 808, respectively. The user interface selection controls 810, 812, 7814 enable the user to select a particular delegatee for a task.

In some instances, a dialog or entry box 816 and a user interface selection control 818 for the dialog box 816 are included in the panel 800. In one aspect, the user can enter the name of a person the user wants to delegate the task to in the dialog box 816 and select the user interface selection control 818 to submit the name of the delegatee to the task assistant. Although radio buttons are shown in FIG. 8, other embodiments are not limited to this configuration. Other user interface selection controls can be used, such as, for example, a drop-down menu, checkboxes, and switches. In some instances, the computing device and/or the task assistant can be configured to receive an audio response (e.g., a verbal input from the user) or text response that selects one of the options.

Figure 9:
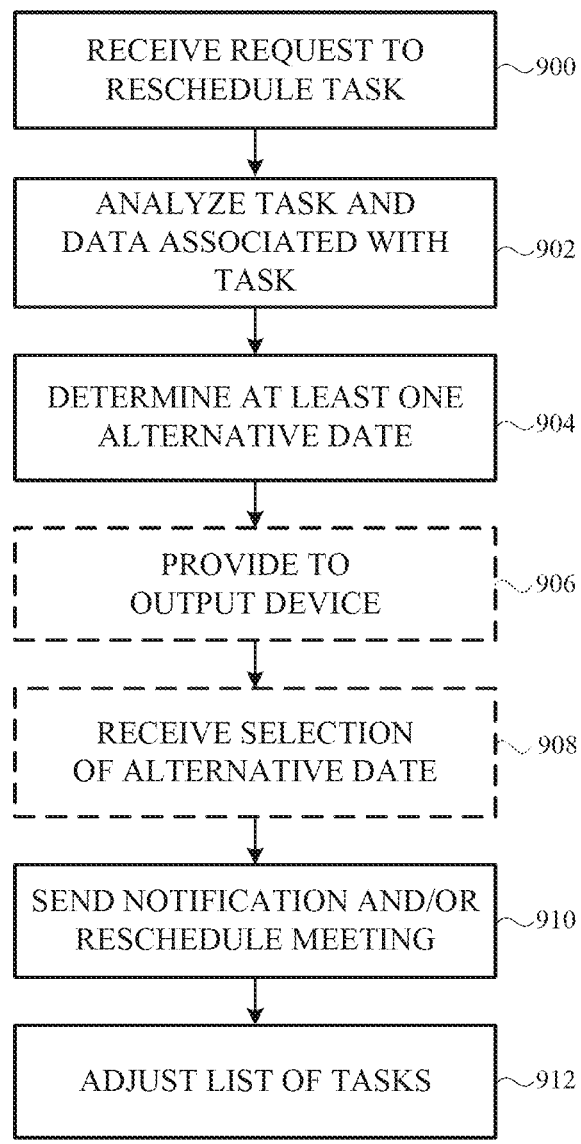
FIG. 9 is a flowchart of a method of rescheduling a task.

FIG. 9 is a flowchart of a method of rescheduling a task. Initially, a task assistant receives a request to reschedule a task at block 900. In one embodiment, the request is submitted to the task assistant in response to a user selecting a control element (e.g., control element 626 in FIG. 6). Alternatively, a request to reschedule a task may be submitted differently, such as via a menu selection (e.g., a drop-down menu), taskbar, or a keyboard shortcut.

Next, as shown in block 902, the task assistant analyzes the task and data associated with the task. For example, the task assistant can analyze the subject of the task, other users associated with the task such as one or more users on the same project or team and/or a manager, a deadline for the task, any attachments associated with the task, other attendees when the task is a meeting, and the like. Based on the analysis, the task assistant can determine one or more alternative times for the task (block 904). For example, if the task is associated with a meeting, the task assistant can determine one or more alternative dates and times for the meeting based at least in part on an analysis of the electronic calendar associated with each attendee. Alternatively, if task is a reminder, a deadline associated with the task can be revised to a different date.

The one or more alternative dates are provided to an output device at block 906. In one embodiment, the alternative date(s) is presented on a display. In another example embodiment, a virtual assistant may present the information by generating an audio output.

A selection of an alternative date (and possibly time) may be received at block 908. For example, the alternative date(s) (and possibly times) can be displayed in a user interface with a user interface selection control that enables the user to select a particular date. At block 910, the task assistant reschedules the task and/or sends a notification to one or more users. The notification can be sent to the user and/or to other users associated with the task. In some embodiments, when the task is a meeting, the notification may be sent to a meeting organizer so the organizer can reschedule the meeting. The notification may include the one or more alternative dates and times.

After the task is rescheduled, the task assistant may adjust the list of tasks (block 912). For example, the task assistant may remove the task from the list of tasks. Alternatively, the task assistant can modify the task to indicate the task is rescheduled. For example, the task may be greyed out, moved to a different position in the list of tasks, and/or the word "Rescheduled" can be added to the text in the task. Other embodiments can perform a different operation when a task is rescheduled.

Blocks 906 and 908 are optional and may be omitted in other embodiments (indicated by dashed lines). For example, a task assistant may determine an alternative date (and possibly time) and automatically reschedule the task without any user interaction or input.

Figure 10:
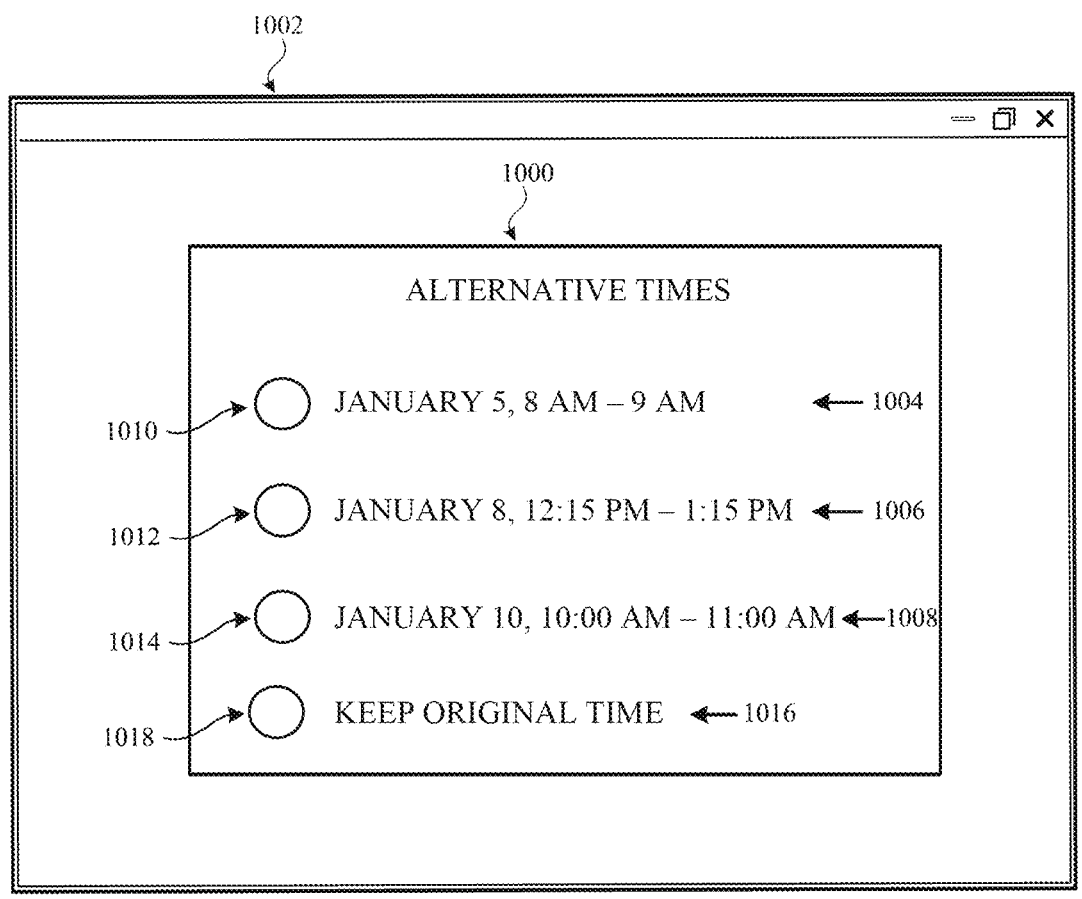
FIG. 10 illustrates an example graphical user interface that may be presented when a task is rescheduled.

FIG. 10 depicts an example graphical user interface that may be presented when a task is rescheduled. In some aspects, the panel 1000 can be used to present alternative time(s) at block 906 in FIG. 9. In the illustrated embodiment, the panel 1000 lists one or more alternative dates and times and is presented in a user interface 1002. Three alternative dates and times 1004, 1006, 1008 are displayed, along with user interface selection controls 1010, 1012, 1014, respectively, that enable the user to select one of the alternatives.

In some embodiments, the notification panel 1000 can also include a selection 1016 and a user interface selection control 1018 that rejects the alternative times and maintains the originally scheduled time. Although radio buttons are shown in FIG. 10, other embodiments are not limited to this configuration. Other user interface selection controls can be used, such as, for example, a drop-down menu, checkboxes, and switches. In some instances, the system can be configured to receive an audio response (e.g., a verbal input from the user) or text response that selects one of the options.

Figure 11:
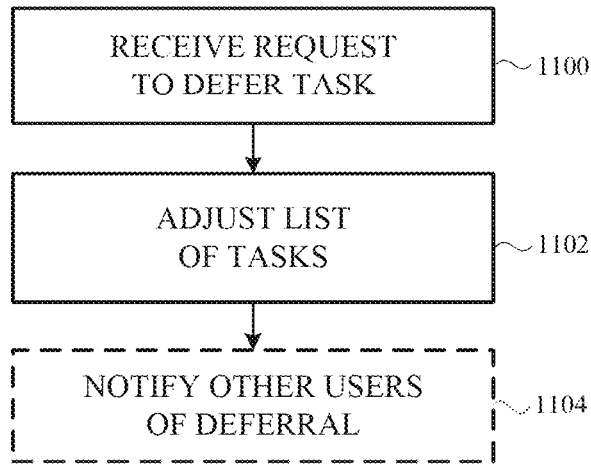
FIG. 11 is a flowchart of a method of deferring a task.

FIG. 11 is a flowchart of a method of deferring a task. Initially, as shown in block 1100, a task assistant receives a request to defer or place a hold on a task. In one embodiment, the request is submitted to the task assistant in response to a user selecting a control element (e.g., control element 620 in FIG. 6). Alternatively, a request to defer or place a hold on a task may be submitted differently, such as via a menu selection (e.g., a drop-down menu), taskbar, or a keyboard shortcut.

Next, as shown in block 1102, the task assistant adjusts the list of tasks. For example, the task assistant may remove the task from the list of tasks. Alternatively, the task assistant can modify the task to indicate the task is deferred or on hold. For example, the task may be greyed out, moved to a different position in the list of tasks (e.g., at the end of the list), and/or the words "On Hold" can be added to the text in the task. Other embodiments can perform a different operation when a task is deferred.

A notification indicating the deferral of the task may be sent to one or more users at block 1104. For example, a notification can be sent to a manager or to other users associated with the task. Block 1104 is optional and can be omitted in other embodiments.

Figure 12:
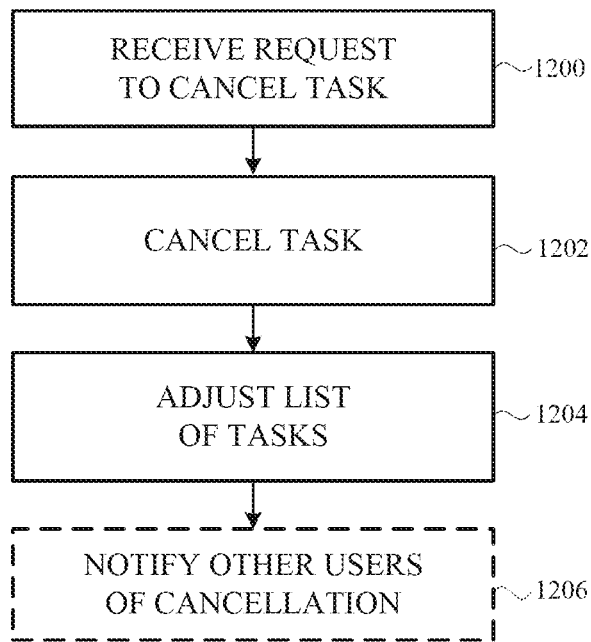
FIG. 12 is a flowchart of a method of canceling a task.

FIG. 12 is a flowchart of a method of canceling a task. Initially, as shown in block 1200, a task assistant receives a request to cancel a task. In one embodiment, the request is submitted to the task assistant in response to a user selecting a control element (e.g., control element 628 in FIG. 6). Alternatively, a request to defer or place a hold on a task may be submitted differently, such as via a menu selection (e.g., a drop-down menu), taskbar, or a keyboard shortcut.

Next, as shown in blocks 1202 and 1204, the task assistant cancels the task and adjusts the list of tasks. For example, the task assistant may remove the task from the list of tasks. Alternatively, the task assistant can modify the task to indicate the task is canceled. For example, the task may be greyed out, moved to a different position in the list of tasks (e.g., at the end of the list), and/or the word "Canceled" can be added to the text in the task. Other embodiments can perform a different operation when a task is deferred.

A notification indicating the cancellation of the task may be sent to one or more users at block 1206. For example, a notification can be sent to a manager or to other users associated with the task. Block 1106 is optional and can be omitted in other embodiments.

Figure 13:
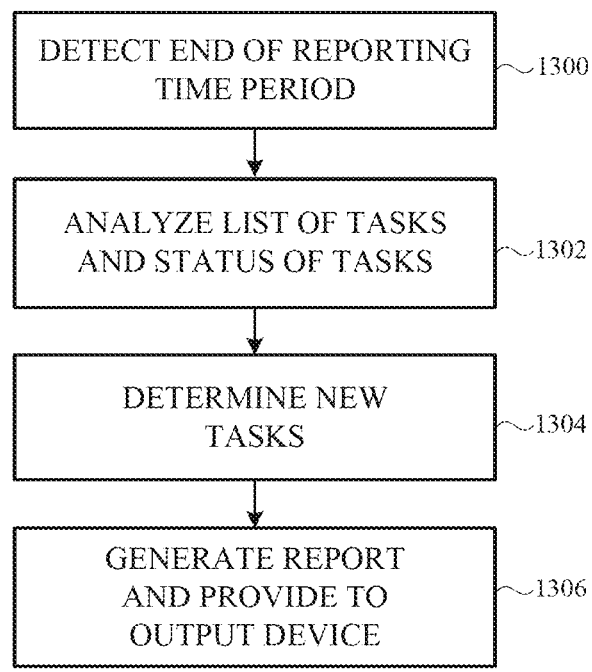
FIG. 13 is a flowchart of a method of providing a summary report at the end of a reporting period.

FIG. 13 is a flowchart of a method of providing a summary report at the end of a reporting period. In some embodiments, the task assistant may generate a summary report on one or more tasks in the list of tasks at the end of the reporting period. For example, the task assistant may generate a summary report at the end of a vacation when the user returns to the office.

Initially, as shown in block 1300, the task assistant may detect the end of the reporting period. For example, the task assistant can analyze the user's calendar to determine the next event or, if the user is out of the office (e.g., on vacation), if the user has indicated a return date in the calendar. Additionally or alternatively, the task assistant may review one or more electronic communications to determine the end of the reporting period.

Based on a detected return date, the task assistant can analyze the task(s) in the list of tasks provided to the user at the start of the reporting period. The task assistant may determine the status of each task in the list. In some embodiments, the task assistant may also determine any new tasks associated with the user that were created during the reporting period (block 1304).

Next, as shown in block 1306, the task assistant can generate a summary report indicating or summarizing the status of the task(s). When the task assistant determines a new task, the new task may also be included in the report. The summary report can be provided to an output device, such as a display. In some embodiments, a virtual assistant may present the summary report and any new tasks via an audio output.

Figure 14:
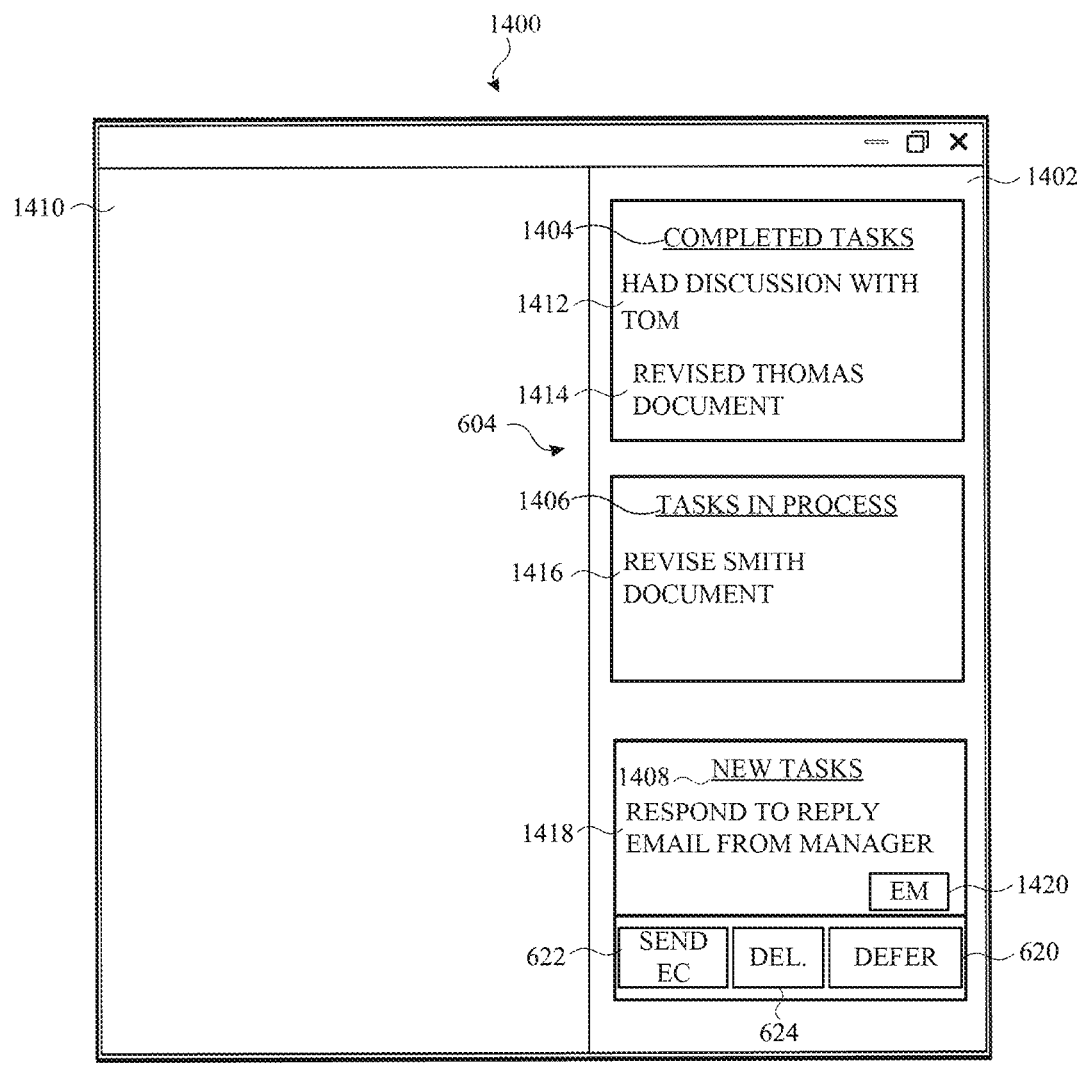
FIG. 14 depicts an example graphical user interface that may present a summary report.

FIG. 14 depicts an example graphical user interface that may present a summary report. In the illustrated embodiment, the graphical user interface 1400 includes a pane 1402 that displays a section 1404 for completed tasks, a section 1406 for tasks in process, and, when new tasks are created during the reporting period, a section 1408 for new tasks. Other embodiments can include fewer or additional sections. Additionally or alternatively, the sections can display other headings for different status reports.

Like the graphical user interface shown in FIG. 6, a second pane 1410 may also be displayed in the user interface 1400. The user interface 1400 can be associated with a particular application, such as an electronic communications application, a calendar application, and the like. Thus, the second pane 1410 may present data associated with the particular application.

The section 1404 for completed tasks includes a first task 1412 and a second task 1414, and the section 1406 for tasks in process includes one task 1416. In some embodiments, the section 1408 for new tasks can configure the new task 1418 as an interactive task that includes one or more control elements. In the illustrated embodiment, the task 1410 is depicted with three control elements 620, 622, 624. Additionally, in some implementations, an electronic message (EM) attachment 1420 related to the task 1418 may be attached to the task 1418.

Figure 15:
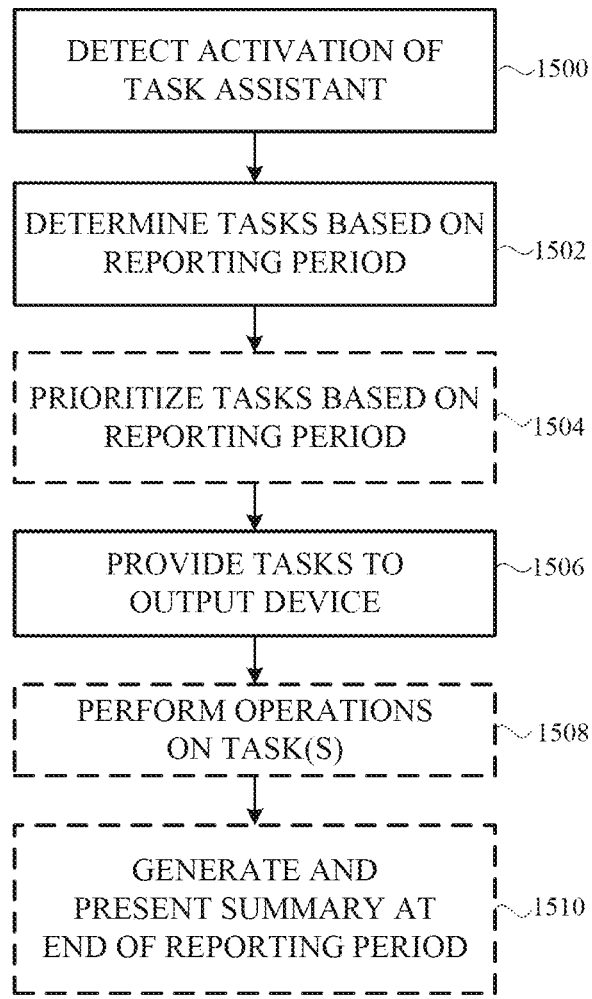
FIG. 15 is a flowchart of an example first method of operating a task assistant.

FIG. 15 is a flowchart of an example first method of operating a task assistant. Initially, as shown in block 1500, activation of the task assistant is detected. As described previously, a user can enable the task assistant manually using a graphical control element presented in a user interface, a menu selection, taskbar, a keyboard shortcut, or a settings or user preference menu. In some embodiments, the task assistant can detect or infer a user will be out of the office and responsively provide task assistance.

Next, as shown in block 1502, one or more tasks is determined for a reporting period. The reporting period can be specified by a user or inferred by the task assistant. For example, as previously described, the task assistant can infer a user will be out of the office for a given period of time, and the given period of time may be the reporting period.

The identified tasks may be prioritized at block 1504 based on the reporting period and/or the content associated with the tasks. The PIP data associated with one or more calendars as well as the content of the events on the calendar(s) can be analyzed to prioritize the tasks. Additionally or alternatively, the PIP data associated with one or more electronic calendars and the content of the electronic communications may be reviewed to prioritize the tasks. In some implementations, the PIP data associated with reminders and the content associated with the reminders can be reviewed to prioritize the tasks.

Next, as shown in block 1506, the tasks or the prioritized tasks are provided to an output device, or are caused to be provided to an output device. For example, the tasks, the prioritized tasks, or a portion of the task/prioritized tasks can be displayed at a display screen. Additionally or alternatively, the tasks, the prioritized tasks, or a portion of the task/prioritized tasks may be provided to a virtual assistant. The virtual assistant can generate an audio output that is output by a speaker. For example, the virtual assistant may "read" the tasks/prioritized tasks.

One or more operations may be performed on a task at block 1508. The operations can include delegating a task, canceling a task, rescheduling a task, deferring a task, and/or indicating a task is completed. In some embodiments, a summary report may be generated and presented at the end of the reporting period (block 1510). The summary report can include a status of each task, any new tasks that were assigned or associated with the user during the reporting period, and an indication of the tasks that were rescheduled, delegated, canceled, and/or deferred.

Figure 16:
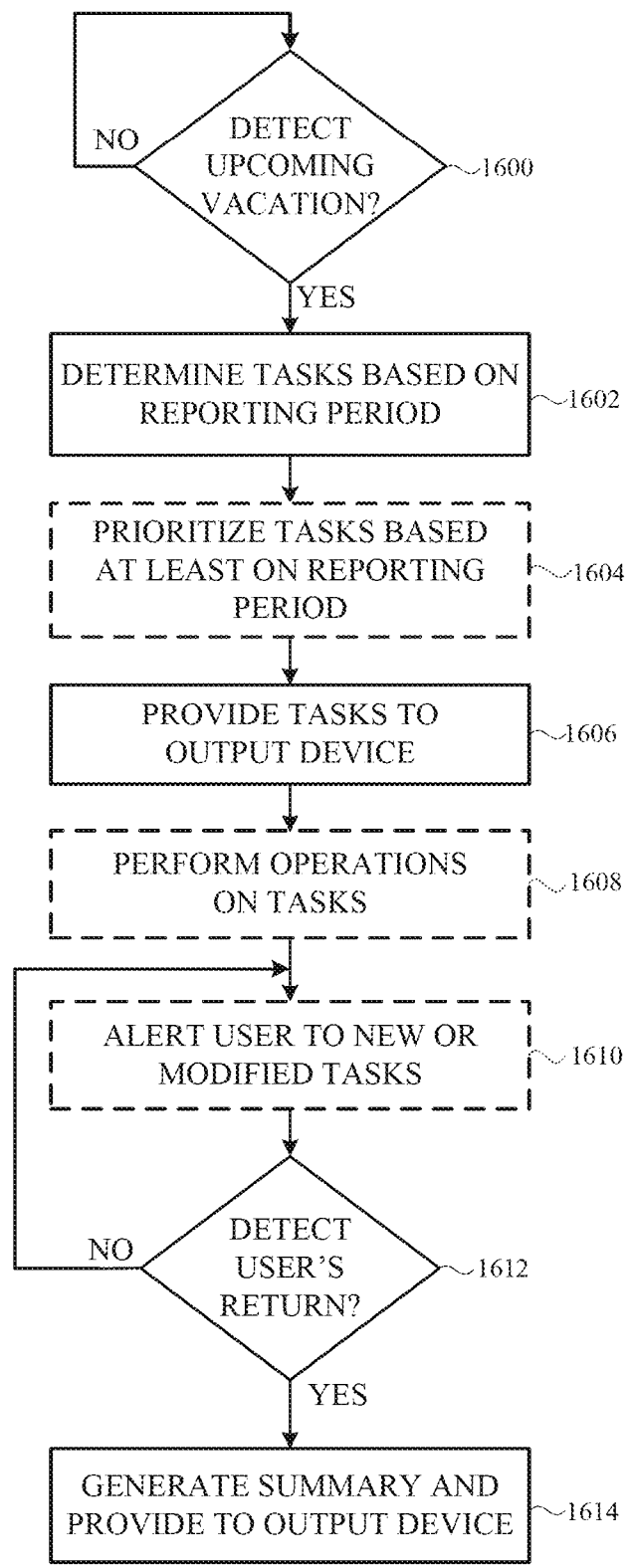
FIG. 16 is a flowchart of an example second method of operating a task assistant.

FIG. 16 is a flowchart of an example second method of operating a task assistant. The method is described in conjunction with a user going on a vacation. However, other embodiments are not limited to this implementation. The method can be used in situations where the user will be unavailable for a given period of time. For example, the user may be on a business trip or out of the office on personal time.

Initially, as shown in block 1600, a determination is made as to whether the task assistant has detected the user will be on vacation (e.g., detects an upcoming vacation). If not, the method waits at block 1600. When the task assistant determines the user will be on vacation, the process passes to block 1602 where the tasks associated with the user are determined based on the reporting period (e.g., the vacation time period). The tasks can be determined using the techniques described herein.

Next, as shown in block 1604, the task assistant may prioritize the tasks based on the reporting period. In some implementations, the task assistant prioritizes the tasks based on the content associated with the tasks as well as the reporting period. Block 1604 is optional and can be omitted in other embodiments.

The tasks are provided to an output device at block 1606. One or more operations may be performed on a task (block 1608). For example, a task can be rescheduled or delegated. Alternatively, a task may be canceled or deferred. If the user completes the task, the user can indicate the task is completed.

In some embodiments, the task assistant can alert the user to new or modified tasks while the user is on vacation (block 1610). For example, the user may be assigned a new task, and based on the task and the content associated with the task, the task assistant can determine the new task has a high priority. The task assistant may generate an electronic communication, such as a notification, to alert the user to the new task. In some instances, the task assistant may also cause an audible alert to be provided to a speaker.

Additionally or alternatively, a task may be modified while the user is on vacation. For example, the priority associated with the task may change (e.g., increase or decrease), or the actions associated with the task can change. The task assistant may generate an electronic communication, such as a notification, to alert the user to the new task. In some instances, the task assistant may also cause an audible alert to be provided to a speaker.

A determination is then made at block 1612 as to whether the task assistant has determined the user has returned from vacation. The task assistant may detect the user has returned from vacation based on location data associated with the user or the computing device associated with the user. Additionally or alternatively, the task assistant may determine the user has returned from vacation by analyzing the PIP data associated with one or more applications (e.g., calendar application, electronic communication application). In some embodiments, the user may specify when he will return to the office, or the user can submit an input (e.g., a selection of a control element) to instruct the task assistant that the user has returned from vacation. When the task assistant detects the user has returned from the vacation, the process continues at block 1614 where a summary report is generated and provided to an output device.

Figure 18A:
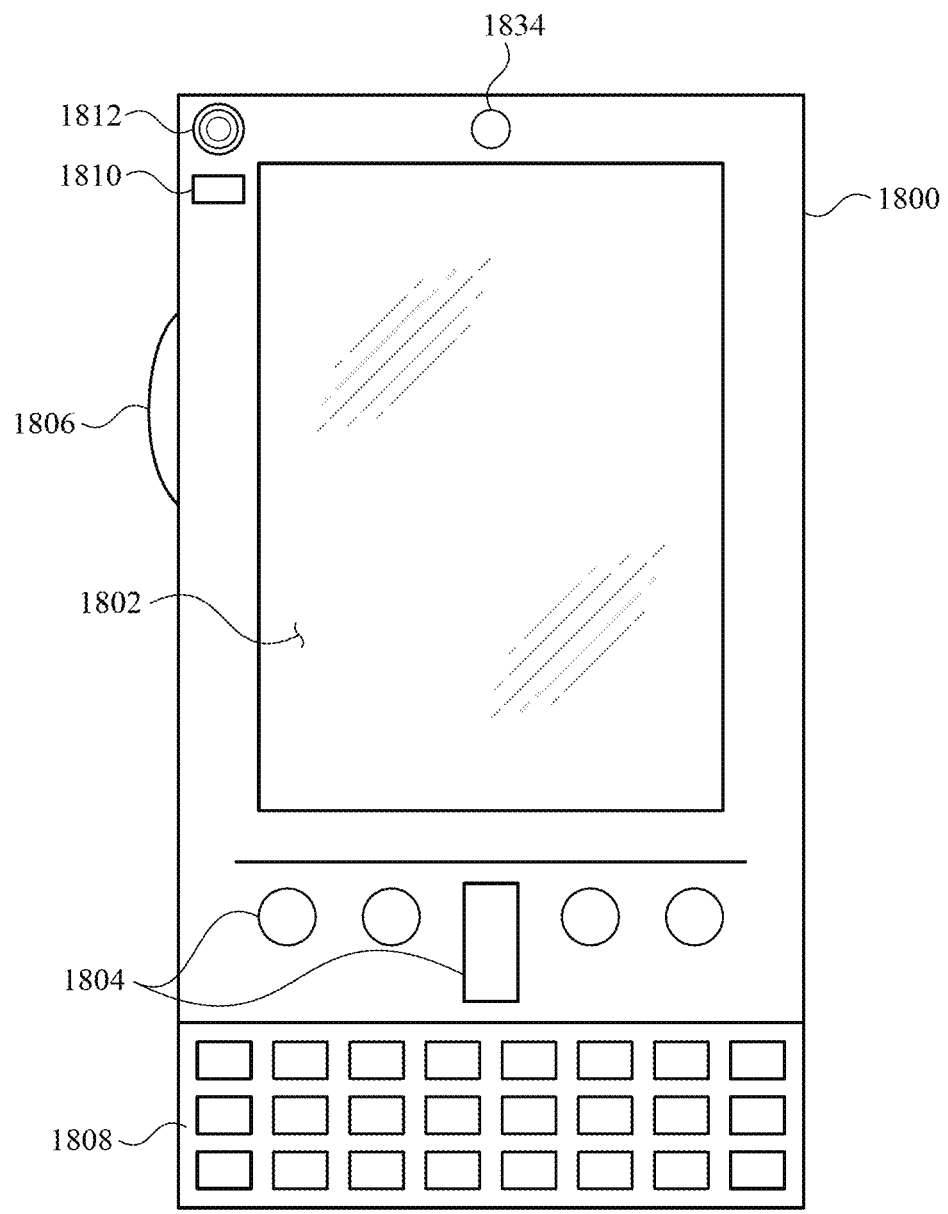
FIGS. 18A-18B are simplified block diagrams illustrating a mobile computing device with which aspects of the present disclosure may be practiced.
Figure 18B:
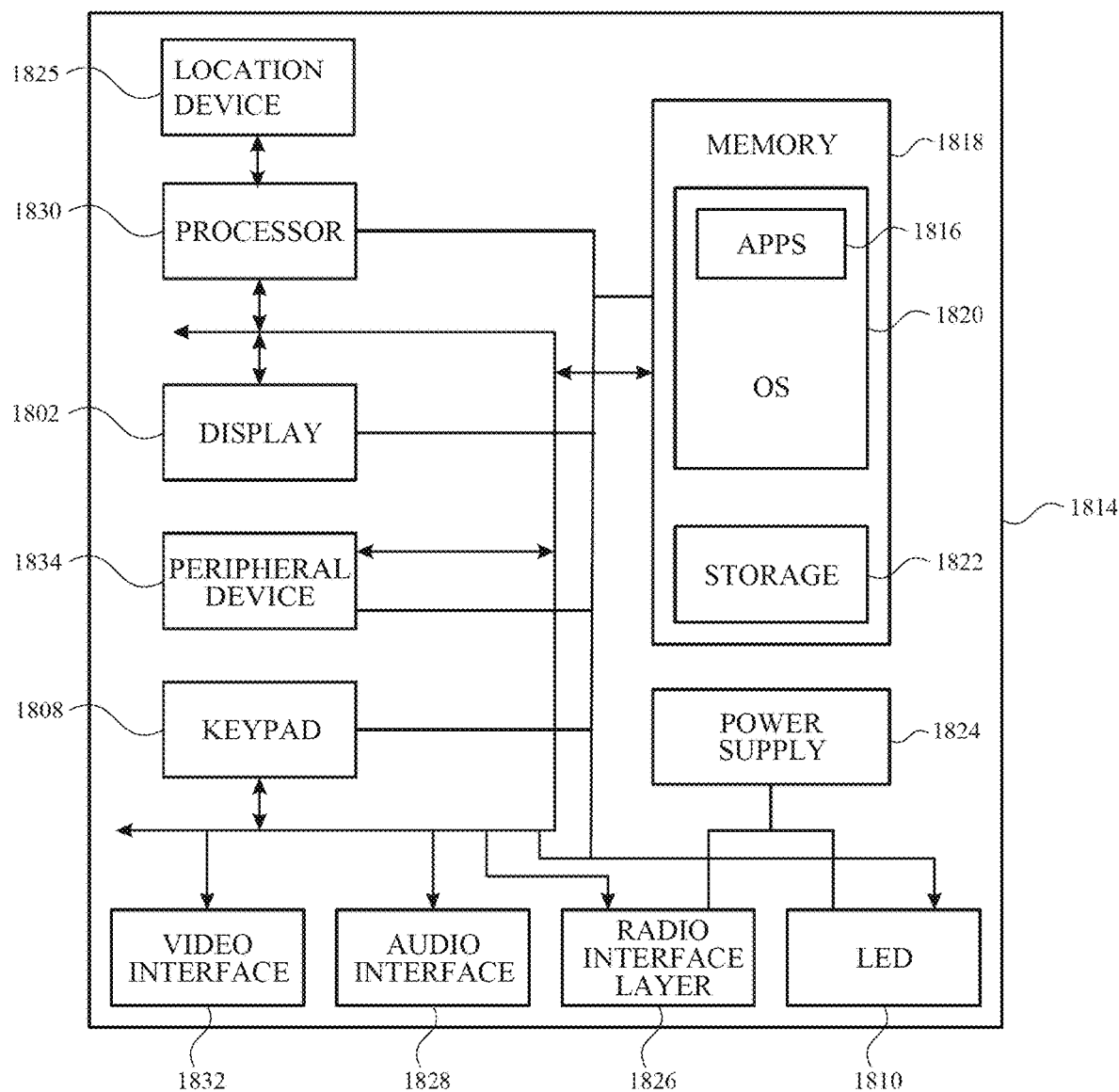
Figure 19:
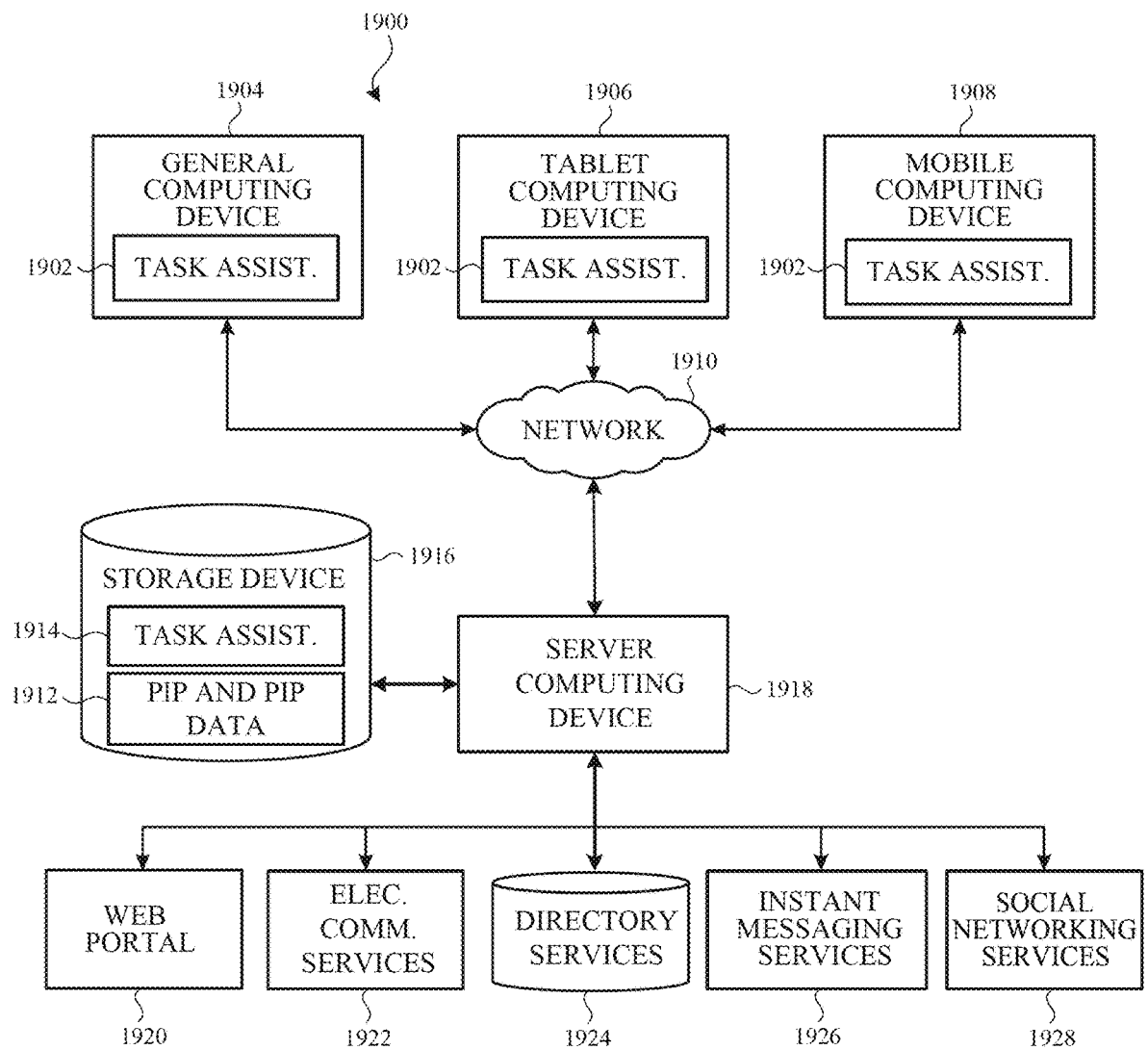
FIG. 19 is a block diagram depicting a distributed computing system in which aspects of the present disclosure may be practiced.

FIGS. 17-19 and the associated descriptions provide a discussion of a variety of operating environments in which aspects of the disclosure may be practiced. However, the devices and systems illustrated and discussed with respect to FIGS. 14-16 are for purposes of example and illustration and are not limiting of a vast number of electronic device configurations that may be utilized for practicing aspects of the disclosure, as described herein.

FIG. 17 is a block diagram illustrating physical components (e.g., hardware) of an electronic device 1700 with which aspects of the disclosure may be practiced. In a basic configuration, the electronic device 1700 may include at least one processing device 1702 and a system memory 1704. Any suitable processing device 1702 can be used. For example, the processing device 1702 may be a microprocessor, an application specific integrated circuit, a field programmable gate array, or combinations thereof.

Depending on the configuration and type of the electronic device 1700, the system memory 1704 may comprise, but is not limited to, volatile storage (e.g., random access memory), non-volatile storage (e.g., read-only memory), flash memory, or any combination of such memories. The system memory 1704 may include a number of program modules and data files, such as an operating system 1706 and one or more PIP applications and PIP data 1708. While executing on the processing device 1702, the PIP application(s) generate and update the PIP data.

In some embodiments, the electronic device 1200 can include a machine learning processing device 1710 that executes a task assistant program 1711. The machine learning processing device 1710 can be any suitable type of processing device. In a non-limiting example, the machine learning processing device 1710 may be a central processing unit, a microprocessor, a field programmable gate array, an application specific integrated circuit, a graphic processing unit, or combinations thereof.

While executing on the machine learning processing device 1710, the task assistant application 1711 may perform and/or cause to be performed processes including, but not limited to, the aspects as described herein. The machine learning processing device 1710 and the task assistant program 1711 can be any suitable type of machine learning or artificial intelligence that learns over time and improves the task assistant processes. For example, the task assistant application 1711, executing on the machine learning processing device 1710, can learn the user's preferred times for meetings, identify which attendees to consider first when delegating a task, improve the process of prioritization based on the user's preferences and interactions with the task assistant, and the like. Using the learned aspects of task assistance, over time the task assistant application 1711 and machine learning processing device 1710 may become more efficient and effective in identifying tasks, prioritizing tasks, and/or performing operations on the tasks.

The operating system 1706, for example, may be suitable for controlling the operation of the electronic device 1700. Furthermore, embodiments of the disclosure may be practiced in conjunction with a graphics library, other operating systems, or any other application program and is not limited to any particular application or system. This basic configuration is illustrated in FIG. 17 by those components within a dashed line 1712.

The electronic device 1700 may have additional features or functionality. For example, the electronic device 1700 may also include additional data storage devices (removable and/or non-removable) such as, for example, magnetic disks, optical disks, or tape. Such additional storage is illustrated in FIG. 17 by a removable storage device 1714 and a non-removable storage device 1716.

The electronic device 1700 may also have one or more input device(s) 1718 such as a keyboard, a trackpad, a mouse, a pen, a sound or voice input device, a touch, force and/or swipe input device, etc. The output device(s) 1720 such as a display, speakers, a printer, etc. may also be included. The aforementioned devices are examples and others may be used. One or more location devices 1722 may be included in the electronic device 1700. For example, the electronic device 1700 can include a global positioning device.

The electronic device 1700 may include one or more communication devices 1724 allowing communications with other electronic devices 1726. Examples of suitable communication devices 1724 include, but are not limited to, radio frequency (RF) transmitter, receiver, and/or transceiver circuitry, universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1704, the removable storage device 1714, and the non-removable storage device 1716 are all computer storage media examples (e.g., memory storage or storage device). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1700. Any such computer storage media may be part of the electronic device 1700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 17 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

FIGS. 18A and 18B illustrate a mobile electronic device 1800, for example, a mobile telephone, a smart phone, wearable computer (such as a smart watch), a tablet computer, a laptop computer, and the like, with which embodiments of the disclosure may be practiced. With reference to FIG. 18A, one aspect of a mobile electronic device 1800 for implementing the aspects described herein is illustrated.

In a basic configuration, the mobile electronic device 1800 is a handheld computer having both input elements and output elements. The mobile electronic device 1800 typically includes a display 1802 and one or more input buttons 1804 that allow the user to enter information into the mobile electronic device 1800. The display 1802 of the mobile electronic device 1800 may also function as an input device (e.g., a display that accepts touch and/or force input).

If included, an optional side input element 1806 allows further user input. The side input element 1806 may be a rotary switch, a button, or any other type of manual input element. In alternative aspects, mobile electronic device 1800 may incorporate more or less input elements. For example, the display 1802 may not be a touch screen in some embodiments. In yet another alternative embodiment, the mobile electronic device 1800 is a portable phone system, such as a cellular phone. The mobile electronic device 1800 may also include an optional keypad 1808. Optional keypad 1808 may be a physical keypad or a "soft" keypad generated on the touch screen display.

In various embodiments, the output elements include the display 1802 for showing a graphical user interface (GUI) of a PIP program, a visual indicator 1810 (e.g., a light emitting diode), and/or an audio transducer 1812 (e.g., a speaker). In some aspects, the mobile electronic device 1800 incorporates a vibration transducer for providing the user with tactile feedback. In yet another aspect, the mobile electronic device 1800 incorporates input and/or output ports, such as an audio input (e.g., a microphone jack), an audio output (e.g., a headphone jack), and a video output (e.g., a HDMI port) for sending signals to or receiving signals from an external device.

FIG. 18B is a block diagram illustrating the architecture of one aspect of a mobile electronic device 1800. That is, the mobile electronic device 1800 can incorporate a system (e.g., an architecture) 1814 to implement some aspects. In one embodiment, the system 1814 is implemented as a "smart phone" capable of running one or more applications (e.g., browser, e-mail, calendaring, contact managers, messaging clients, games, media clients/players, diagramming, and sharing applications and so on). In some aspects, the system 1814 is integrated as an electronic device, such as an integrated personal digital assistant (PDA) and wireless phone.

One or more application programs 1816 may be loaded into the memory 1818 and run on or in association with the operating system 1820. Examples of the application programs include phone dialer programs, e-mail programs, PIP programs, a task assistant program, word processing programs, spreadsheet programs, Internet browser programs, messaging programs, and so forth.

The system 1814 also includes a non-volatile storage area 1822 within the memory 1818. The non-volatile storage area 1822 may be used to store persistent information that should not be lost when the system 1814 is powered down.

The application programs 1816 may use and store information in the non-volatile storage area 1822, such as PIP data, documents, or other messages used by an email application, and the like. A synchronization application (not shown) also resides on the system 1814 and is programmed to interact with a corresponding synchronization application resident on a host computer to keep the information stored in the non-volatile storage area 1822 synchronized with corresponding information stored at the host computer.

The system 1814 has a power supply 1824, which may be implemented as one or more batteries. The power supply 1024 may further include an external power source, such as an AC adapter or a powered docking cradle that supplements or recharges the batteries.

One or more location devices 1825 may be included in the system 1814. For example, the system 1814 can include a global positioning device.

The system 1814 may also include a radio interface layer 1826 that performs the function of transmitting and receiving radio frequency communications. The radio interface layer 1826 facilitates wireless connectivity between the system 1814 and the "outside world," via a communications carrier or service provider. Transmissions to and from the radio interface layer 1826 are conducted under control of the operating system 1820. In other words, communications received by the radio interface layer 1826 may be disseminated to the application programs 1816 via the operating system 1820, and vice versa.

The visual indicator 1810 may be used to provide visual notifications, and/or an audio interface 1828 may be used for producing audible notifications via an audio transducer (e.g., audio transducer 1812 illustrated in FIG. 18A). In the illustrated embodiment, the visual indicator 1810 is a light emitting diode (LED) and the audio transducer 1812 may be a speaker. These devices may be directly coupled to the power supply 1824 so that when activated, they remain on for a duration dictated by the notification mechanism even though the processor 1830 and other components might shut down for conserving battery power. The LED may be programmed to remain on indefinitely until the user takes action to indicate the powered-on status of the device.

The audio interface 1828 is used to provide audible signals to and receive audible signals from the user (e.g., voice input such as described above). For example, in addition to being coupled to the audio transducer 1812, the audio interface 1828 may also be coupled to a microphone to receive audible input, such as to facilitate a telephone conversation. In accordance with embodiments of the present disclosure, the microphone may also serve as an audio sensor to facilitate control of notifications, as will be described below.

The system 1814 may further include a video interface 1832 that enables an operation of peripheral device 1834 (e.g., on-board camera) to record still images, video stream, and the like.

A mobile electronic device 1800 implementing the system 1814 may have additional features or functionality. For example, the mobile electronic device 1800 may also include additional data storage devices (removable and/or non-removable) such as, magnetic disks, optical disks, or tape. Such additional storage is illustrated in FIG. 18B by the non-volatile storage area 1822.

Data/information generated or captured by the mobile electronic device 1800 and stored via the system 1814 may be stored locally on the mobile electronic device 1800, as described above, or the data may be stored on any number of storage media that may be accessed by the device via the radio interface layer 1826 or via a wired connection between the mobile electronic device 1800 and a separate electronic device associated with the mobile electronic device 1800, for example, a server-computing device in a distributed computing network, such as the Internet (e.g., server computing device 1918 in FIG. 19). As should be appreciated such data/information may be accessed via the mobile electronic device 1800 via the radio interface layer 1826 or via a distributed computing network. Similarly, such data/information may be readily transferred between electronic devices for storage and use according to well-known data/information transfer and storage means, including electronic mail and collaborative data/information sharing systems.

As should be appreciated, FIG. 18A and FIG. 18B are described for purposes of illustrating the present methods and systems and is not intended to limit the disclosure to a particular sequence of steps or a particular combination of hardware or software components.

FIG. 19 is a block diagram illustrating a distributed system in which aspects of the disclosure may be practiced. The system includes a PIP program 1902 in a general computing device 1904 (e.g., a desktop computer), a tablet computing device 1906, and/or a mobile computing device 1908. The general computing device 1904, the tablet computing device 1906, and the mobile computing device 1908 can each include the components, or be connected to the components, that are shown associated with the electronic device 1700 in FIG. 17 or the mobile electronic device 1800 in FIGS. 18A-18B.

The general computing device 1904, the tablet computing device 1906, and the mobile computing device 1908 are each configured to access one or more networks (represented by network 1910) to interact with a PIP 1912 and/or a task assistant program 1914 stored in one or more storage devices (represented by storage device 1916) and executed on one or more server computing devices (represented by server computing device 1918). In some aspects, the server computing device 1918 can access and/or receive various types of services, communications, documents and information transmitted from other sources, such as a web portal 1920, an electronic communications services 1922, directory services 1924, instant messaging and/or text services 1926, and/or social networking services 1928. In some instances, these sources may provide robust reporting, analytics, data compilation and/or storage service, etc., whereas other services may provide search engines or other access to data and information, images, graphics, videos, document processing and the like.

As should be appreciated, FIG. 19 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternative aspects falling within the spirit of the broader aspects of the general inventive concept embodied in this application that do not depart from the broader scope of the claimed disclosure.

The invention claimed is:

1. A method, comprising:

determining, by a computing device, scheduled tasks associated with a user in a reporting period from personal information program (PIP) data of the user associated with an electronic calendar application, an electronic reminder application, an electronic contacts application, a collaborative application, or an electronic communication application, wherein the reporting period comprises a time period when the user will be unavailable;

generating, for each task in the reporting period, a priority for the task using a machine learning model based on the reporting period, due date, enterprise data, and content associated with the task, wherein the machine learning model was trained at least in part using PIP data for a plurality of users;

ranking the scheduled tasks based on the generated priorities to generate a set of prioritized tasks for the user during the reporting period; and providing at least a portion of the set of prioritized tasks to an output device for display to the user.

2. The method of claim 1, further comprising at least one of:

determining, by the computing device, a delegatee for a task based on a request to delegate the task; or determining, by the computing device, a reschedule date for a task based on a request to reschedule the task.

3. The method of claim 2, wherein the task comprises a meeting and the reschedule date is determined based on events in an electronic calendar associated with the user and events in an electronic calendar associated with one or more other attendees to the meeting.

4. The method of claim 1, further comprising:

prior to determining the scheduled tasks associated with the user, determining, by the computing device, the user will be unavailable during the reporting based on the PIP data associated with the electronic calendar application, the electronic reminder application, the electronic contacts application, the electronic collaborative application, or the electronic communication application.

5. The method of claim 4, wherein the method further comprises determining, by the computing device, the reporting period has ended and the user is available based on location data associated with the user.

6. The method of claim 1, wherein the method further comprises determining, by the computing device, the reporting period has ended and the user is available based on the PIP data associated with at least one of the electronic calendar application, the electronic reminder application, the electronic contacts application, the electronic collaborative application, or the electronic communication application.

7. The method of claim 1, wherein determining the scheduled tasks associated with the user in the reporting period further comprises determining the scheduled tasks associated with the user in the reporting period based on scheduled tasks associated with a time period prior to the reporting period.

8. The method of claim 1, wherein providing the at least the portion of the set of prioritized tasks comprises causing the at least the portion of the set of prioritized tasks to be displayed in a single user interface on a display screen.

9. The method of claim 1, wherein the content associated with each task comprises one or more of:

data associated with a structure of an organization associated with the user;

other users associated with the task;

one or more documents associated with the task;

a deadline associated with the task; or a subject of the task.

10. The method of claim 1, wherein the enterprise data associated with the task includes a relationship graph comprising a direct or an indirect association between the user and one or more other users.

11. The method of claim 1, wherein the reporting period comprises a period of time for which the user is out-of-office.

12. A system, comprising:

a processing device; and a memory storing instructions, that when executed by the processing device, cause the system to:

determine scheduled tasks associated with a user in a reporting period from personal information program (PIP) data of the user associated with at least one of an electronic calendar application, an electronic reminder application, an electronic contacts application, an electronic collaborative application, or an electronic communication application, wherein the reporting period comprises a time period when the user will be unavailable;

generate, for each task in the reporting period, a priority of the task using a machine learning model based on the reporting period, due date, enterprise data, and content associated with the task, wherein the machine learning model was trained at least in part using PIP data for a plurality of users;

rank the scheduled tasks based on the generated priorities to generate a set of prioritized tasks for the user during the reporting period; and provide the set of prioritized tasks to an output device for display to the user.

13. The system of claim 12, wherein the memory stores further instructions for causing the system to:

determine a delegatee for a task based on a request to delegate the task; and determine a reschedule date for a task based on a request to reschedule the task.

14. The system of claim 12, wherein the memory stores further instructions for causing the system to:

determine, prior to determining the scheduled tasks, the user will be unavailable during the reporting period based on the PIP data associated with at least one of the electronic calendar application, the electronic reminder application, the electronic contacts application, the collaborative application, or the electronic communication application.

15. The system of claim 14, wherein the memory stores further instructions for causing the system to determine the user is available based on location data associated with the user.

16. The system of claim 12, wherein the memory stores further instructions for causing the system to determine the reporting period has ended and the user is available based on the PIP data associated with at least one of the electronic calendar application, the electronic reminder application, the electronic contacts application, the collaborative application, or the electronic communication application.

17. The system of claim 12, wherein determining the tasks associated with the user in the reporting period comprises determining the tasks associated with the user in the reporting period based on tasks associated with a time period prior to the reporting period.

18. The system of claim 12, wherein the content associated with each task comprises:
   data associated with a structure of an organization associated with the user;
   other users associated with the task;
   one or more documents associated with the task;
   a deadline associated with the task; or
   a subject of the task.

19. A method, comprising:
   determining, by a processing device, a plurality of scheduled tasks associated with a user in a reporting period by analyzing personal information program (PIP) data of the user associated with an electronic calendar application, an electronic reminder application, an electronic contacts application, or an electronic communication application, wherein the reporting period comprises a time when the user will be unavailable;
   generating, for each scheduled task in the plurality of scheduled tasks in the reporting period, a priority of the task based on the reporting period, due date, enterprise data, and content associated with the task using a machine learning model that was trained at least in part using PIP data for a plurality of users;
   ranking the plurality of scheduled tasks based on the generated priorities to generate a set of prioritized tasks for the user during the reporting period; and
   causing, by the processing device, a portion of the set of prioritized tasks to be displayed in a user interface, wherein one task of the set of prioritized tasks comprises an interactive notification comprising one or more control elements that each enable the user to perform an operation on the task.

20. The method of claim 19, wherein the operation comprises delegating the task, rescheduling the task, canceling the task, deferring the task, or indicating the task is completed.

* * * * *